United States Patent
Shimamura et al.

(10) Patent No.: US 8,582,681 B2
(45) Date of Patent: Nov. 12, 2013

(54) SIGNAL RECEIVER APPARATUS AND WAVEFORM SHAPING METHOD

(75) Inventors: Akira Shimamura, Yokohama (JP); Koichi Mita, Yokohama (JP); Hideshi Fujishima, Sagamihara (JP); Takashi Arai, Yokohama (JP); Shunichi Ko, Yokohama (JP); Takuya Terasawa, Yokohama (JP); Koji Mikami, Shinjuku (JP); Naoya Komada, Yamato (JP)

(73) Assignee: Spansion LLC, Sunnyvale, CA (US)

( * ) Notice: Subject to any disclaimer, the term of this patent is extended or adjusted under 35 U.S.C. 154(b) by 1057 days.

(21) Appl. No.: 12/410,152

(22) Filed: Mar. 24, 2009

(65) Prior Publication Data

US 2009/0225901 A1 Sep. 10, 2009

Related U.S. Application Data

(63) Continuation of application No. PCT/JP2006/319364, filed on Sep. 28, 2006.

(51) Int. Cl.
*H04B 15/00* (2006.01)

(52) U.S. Cl.
USPC ........... 375/285; 375/284; 375/296; 375/346; 375/350

(58) Field of Classification Search
USPC ......... 375/258–259, 316, 285, 284, 296, 346, 375/350; 340/572.2; 235/492
See application file for complete search history.

(56) References Cited

U.S. PATENT DOCUMENTS

| | | | | |
|---|---|---|---|---|
| 7,292,532 | B2* | 11/2007 | Sakata et al. | 370/230.1 |
| 7,432,814 | B2* | 10/2008 | Dietrich et al. | 340/572.4 |
| 2007/0058694 | A1* | 3/2007 | van Nee | 375/142 |
| 2011/0241807 | A1* | 10/2011 | Matsui | 333/28 R |

FOREIGN PATENT DOCUMENTS

| | | |
|---|---|---|
| JP | 07-87137 A | 3/1995 |
| JP | 11-239187 A | 8/1999 |
| JP | 2000-101483 A | 4/2000 |
| JP | 2001-211212 A | 8/2001 |
| JP | 2004-112059 A | 4/2004 |
| JP | 2004-363861 A | 12/2004 |
| WO | WO 2004/025866 A1 | 3/2004 |

* cited by examiner

*Primary Examiner* — Phuong Phu
(74) *Attorney, Agent, or Firm* — Sterne, Kessler, Goldstein & Fox P.L.L.C.

(57) ABSTRACT

A signal receiver apparatus includes a waveform shaping data storage device storing waveform shaping data of a signal transmitted with a given timing from a signal transmitter device of a plurality of signal transmitter devices which are coupled to the signal receiver apparatus for each of the plurality of signal transmitter devices, and a waveform shaping device reading waveform shaping data of the signal transmitter device in the plurality of signal transmitter device from the waveform shaping data storage device when a signal from the signal transmitter device is received, and shaping a waveform of a received signal from the signal transmitter device.

14 Claims, 30 Drawing Sheets

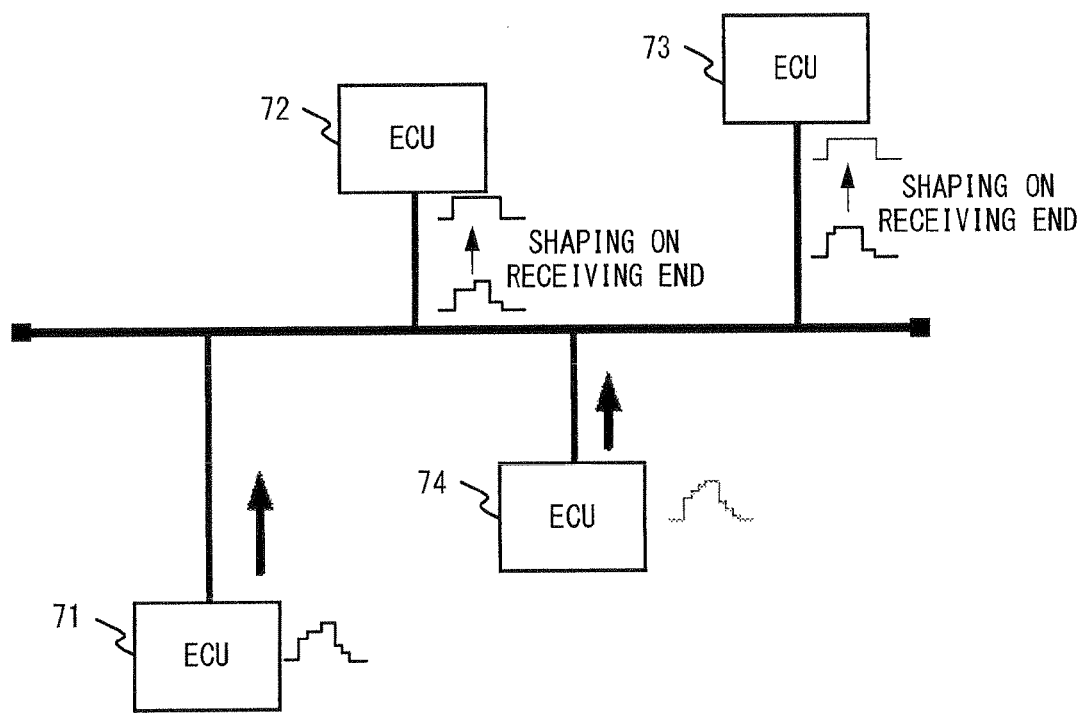
F I G. 6 A

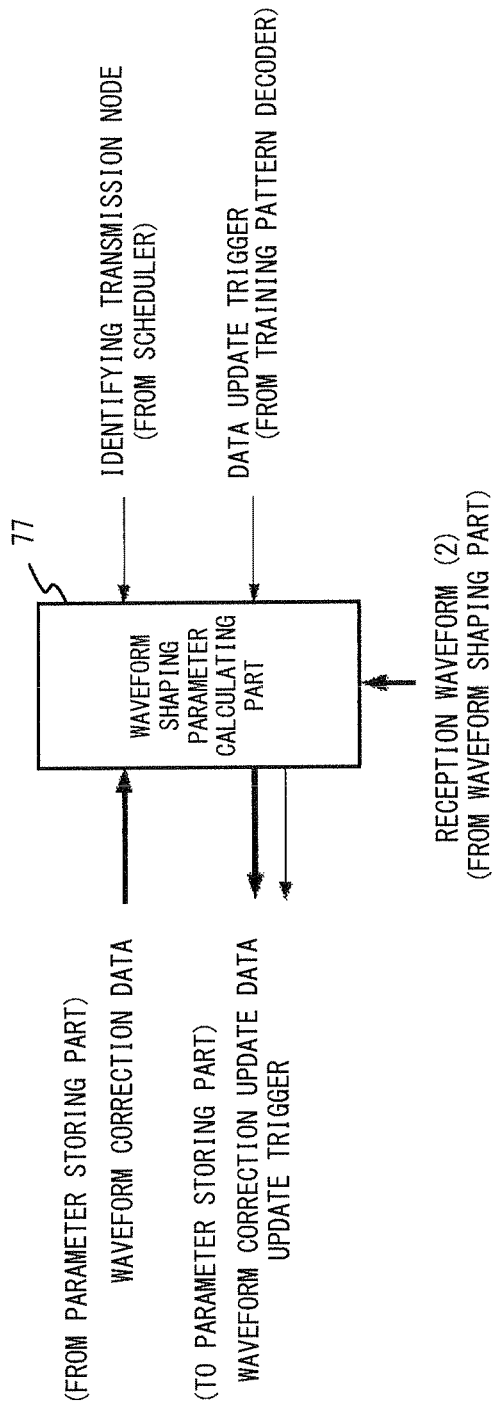
F I G. 8A

| COMMUNICATION NODE TYPE | H/"L" IDENTIFIER | SAMPLING TIME | WAVEFORM SHAPING DATA |
|---|---|---|---|
| MODE1 | "H" | 0 | H0 |
| | | 1 | H1 |
| | | 2 | H2 |
| | | 3 | H3 |
| | | 4 | H4 |
| | | 5 | H5 |
| | | 6 | H6 |
| | | 7 | H7 |
| | "L" | 0 | L0 |
| | | 1 | L1 |
| | | 2 | L2 |
| | | 3 | L3 |
| | | 4 | L4 |
| | | 5 | L5 |
| | | 6 | L6 |
| | | 7 | L7 |
| MODE2 | "H" | 0 | H0 |
| | | 1 | H1 |
| | | 2 | H2 |
| | | 3 | H3 |
| | | 4 | H4 |
| | | 5 | H5 |
| | | 6 | H6 |
| | | 7 | H7 |
| | "L" | 0 | L0 |
| | | 1 | L1 |
| | | 2 | L2 |
| | | 3 | L3 |
| | | 4 | L4 |
| | | 5 | L5 |
| | | 6 | L6 |
| | | 7 | L7 |

F I G. 9 C

SIGNAL RECEIVER APPARATUS AND WAVEFORM SHAPING METHOD

CROSS-REFERENCE TO RELATED APPLICATION

This application is a Continuation Application of International Application No. PCT/JP2006/319364, having an international filing date of Sep. 28, 2006, which is hereby incorporated in its entirety by reference.

FIELD

The present embodiments discussed herein are related to the signal receiver apparatus and a waveform shaping method.

BACKGROUND

In a data communication system using a bus used in a control system of a vehicle etc., there is an increasing amount of data transfer with multifunction and electronic controlling operations. To process the increasing amount of data transfer, it can be considered that the number of cables is increased to expand the communication capacity. However, to generate a light weight system, the number of cables used for wiring are reduced to the smallest possible number.

Therefore, it is used to increase the amount of data transfer per cable.

In the current data communications of a control system, the data communications are performed through a bus coupling. Since a conventional control system has a small data transfer band, it is not used to make a correction after waveform degradation. However, with an increasing number of bands to increase the amount of data transfer as described above, there has been a serious problem of the influence of the waveform degradation.

FIG. 1 is an example of a communication system network and FIG. 2 is an explanatory view of waveform degradation.

The communication system network illustrated in FIG. 1 is configured by coupling electronic control units (ECUs) 11 through 15 to a bus 10. The power supply of an ECU 13 is turned off. In a car-mounted communication system network, only both ends of the bus 10 are terminated for the network, and there can be ECUs coupled on the stub without termination.

Therefore, there occurs waveform degradation from inconsistency due to different stub lengths between each of the ECUs 11 through 15 and the bus 10, an uncoupled end, etc., and a fluctuation of the amount of reflection by whether or not the power supply of each of the ECUs 11 through 15 is input.

The waveform of a signal from each of the ECUs 12 through 15 received by the ECU 11 is affected by a reflective wave from another ECU and an uncoupled end. That is, reflective waves from the ECUs 13 through 15 and an uncoupled end are superposed on a signal from the ECU 12, and on a signal from another ECU. In this case, the shape of the waveform degradation is a complicated waveform in relation to the distance between the ECU of the transmitting end and each of the remaining ECUs, and there are different waveforms depending on the positions relative to the receiving end.

FIG. 2 illustrates an example of the transmission waveform accompanied by waveform degradation. As indicated by the portions enclosed by the dotted ovals in FIG. 2, waveform degradation occurs with the reflective wave superposed on the one data bit waveform. The amount of waveform degradation depends on the combination of a receiving end ECU and a transmitting end ECU.

When the waveform degradation is used without correction, the allowance noise is reduced, thereby affecting the quality of a signal. By reducing the number of ECUs that can be mounted in the similar network, for example, by one-to-one coupling each ECU that is to perform communications, the problem can be avoided. However, this increases the number of independent networks, thereby directly increasing the cost.

A filtering method using an oversampling operation and a majority decision circuit is well known as a waveform shaping method against the above-mentioned waveform degradation.

FIG. 3A illustrates an example of a circuit configuration of performing a filtering process using an oversampling operation and a majority decision circuit. A receiver 31 determines the level of a received signal and outputs "1" or "0" to a shift register 32. The shift register 32 is driven by a sampling clock of the speed five times as fast as the bit rate in the example illustrated in FIG. 3A, and holds five pieces of 1-bit width output sequentially sampled from the receiver 31. The five sampling values held in the shift register 32 are input to a majority decision circuit 33, a majority decision is made between "0" and "1", and a determination is made between "0" and "1" of the received data.

FIG. 3B illustrates the reception waveform of the receiver 31 illustrated in FIG. 3A, the "0" or "1" determination level, and the sampling clock. The waveform degradation occurs by a reflective wave at the portions enclosed by the dotted ovals.

FIG. 3C illustrates the reflective wave superposed on a signal when the signal is transmitted from the ECU 11 to the ECU 12 in the communication system network illustrated in FIG. 1. As illustrated in FIG. 3C, the reflective waves from the ECUs 13 through 15 and the uncoupled end are superposed on the transmission signals from the ECU 11 to the ECU 12.

When a large number of devices are coupled to a network, the waveform degradation easily occurs, and there is the possibility that an erroneous determination of "0" or "1" is made although a majority decision circuit is used. Since no waveform correction is made, a waveform correcting process cannot be performed when the amount of reflection becomes large in the filtering process using oversampling and a majority decision circuit.

Furthermore, the amount of waveform degradation depends on the position of each ECU at a receiving end. Using the majority decision circuit 33, an erroneous determination due to a temporary fall of a signal level can be filtered, but the durability to, for example, the superposition of noise becomes lower.

The conventional technology for counteracting the waveform degradation by a reflective wave is disclosed by the following patent documents 1 and 2:
Patent Document 1: Japanese Laid-open Patent Publication No. 7-87137
Patent Document 2: Japanese Laid-open Patent Publication No. 2004-363861

The conventional technology discussed by the patent document 1 relates to a transmission system for coupling a plurality of programmable controllers. In the transmission system, an appropriate termination resistor is selected and coupled to a transmission line. Therefore, the technology described in the patent document 1 does not solve the problem of the transmission system including a transmission line terminal not terminated as illustrated in FIG. 1.

The conventional technology discussed by the patent document 2 relates to the technology capable of correctly transmitting a signal although there is a reflected signal occurring from the inconsistency of impedance in the signal transmission system using a transmission line having an uneven characteristic impedance structure.

According to the conventional technology of transmitting a signal discussed by the patent document 2, the signal transmitting end transmits a measuring signal prior to the transmission of a signal to be originally transmitted, and measures the reflective wave. In one method, the signal transmitting end corrects and transmits a transmission signal on the basis of the measured reflective wave (first method). In another method, the information about a measured reflective wave is transmitted to a receiving end, and the receiving end corrects a reception waveform on the basis of the information about the transmitted reflective wave (second method).

The conventional method discussed in the above-mentioned patent document 2 is effective when the signal transmitting end and receiving end are coupled one to one, but it is not appropriate when applied to a system to which a number of signal transmitter devices are coupled. Therefore, when the number of signal transmitter device increases, it is used to also increase the number of cables.

FIG. 4 is an explanatory view of correcting a waveform when the first method disclosed by the patent document 2 is adopted for a bus system to which a plurality of ECUs are coupled.

When a signal is transmitted from an ECU 41 to an ECU 42 or an ECU 43, a measuring signal is transmitted from the ECU 41 to a bus 40 in the first method. Then, the ECU 41 measures the received reflective wave, but the reflective wave is the reflective wave from the ECU 42 through the route (1) illustrated in FIG. 4 superposed on the reflective wave from the ECU 43 through the route (2).

Therefore, in the case of the network in which there are a number of receiving ends, the waveform degradation largely depends on the position of a receiving ECU. However, the waveform correcting data refers to an average correction value of the network. For the ECU 42 in FIG. 4, the correction for the reflection through the route (2) is an excess correction. For the ECU 43, the correction for the reflection through the route (1) is an excess correction.

Described below with reference to FIGS. 5A and 5B is the waveform correction performed when the second conventional method discussed by the patent document 2 is applied to a bus system to which a plurality of ECUs are coupled.

FIG. 5A illustrates the reflective wave when a measuring signal is transmitted from an ECU 51 to transmit data from the ECU 51 to an ECU 52. FIG. 5B illustrates the reflective wave when a measuring signal is transmitted from an ECU 54 to transmit data from the ECU 54 to the ECU 52. In these figures, it is assumed that the ECU 51 and the ECU 54 have a transmitting function. For example, in the case illustrated in FIG. 5A, the reflective wave measured by the ECU 51 is not only the reflective wave from the ECU 52, but is a superposed reflective wave from an ECU 53 and the ECU 54. Furthermore, the reflective waves received by the ECU 52 from the ECUs 53 and 54 cannot be measured by the ECU 51. Therefore, in the case of the transmission from the ECU 51, if a waveform correction is made by the receiving ECU 52, the correction for the reflective waveform from the ECUs 53 and 54 is deficient. That is, when the second method disclosed by the patent document 2 is applied to the system illustrated in FIGS. 5A and 5B, then the receiving ECU 52 receives at least the reception waveform shaping data immediately before receiving the data to be originally received from the ECUs 51 and 54 capable of transmitting data. However, when the ECUs 51 and 54 independently transmit data, the ECU 52 cannot receive the reflective waveform shaping data from both of the ECUs 51 and 54.

Thus, in the conventional technology with a two-way bus coupling in which there are a plurality of receiving ends and a plurality of transmitting ends, the waveform shaping process cannot be effectively performed on a reflective waveform.

Aforementioned conventional methods do not perform an effective waveform shaping process on a reflective waveform in a bus system in which a plurality of transmitting ends and receiving ends are coupled. In a bus coupling in which there are a number of transmitting ends and receiving ends, the waveform shaping cannot be performed by one constant. That is, an individual constant for each transmitting source may be required, or a device for using the constant when data is received from the transmitting source may be required.

SUMMARY

According to an aspect of the embodiments, a signal receiver apparatus includes a waveform shaping data storage device storing waveform shaping data of a signal transmitted with a given timing from a signal transmitter device of a plurality of signal transmitter devices which are coupled to the signal receiver apparatus for each of the plurality of signal transmitter devices, and a waveform shaping device reading waveform shaping data of the signal transmitter device in the plurality of signal transmitter device from the waveform shaping data storage device when a signal from the signal transmitter device is received, and shaping a waveform of a received signal from the signal transmitter device. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6A illustrates an example of a communication system network to which the present embodiment is applied;

FIG. 8A is an explanatory view of data input/output of the waveform shaping parameter calculating part;

FIG. 9C illustrates an example of the format of the waveform shaping data;

DESCRIPTION OF EMBODIMENTS

FIG. 6A illustrates an example of a communication system network to which the present embodiment is applied.

Assume that ECUs 71 and 74 are transmitting ends and ECUs 72 and 73 are receiving ends. The transmission schedules of the ECUs 71 and 74 are given, and communications are performed according to the transmission schedules. The ECUs 72 and 73 as receiving ends respectively store the waveform shaping parameter corresponding to the transmission waveform from the ECU 71 and the waveform shaping parameter corresponding to the transmission waveform from the ECU 74. The receiving ends performs the waveform shaping by selectively using the waveform shaping parameters on the basis of the transmission schedules of the ECUs 71 and 74. If one ECU performs two-way (transmission/reception) communications, it has the functions of both transmission and reception ends.

Figure 6B:
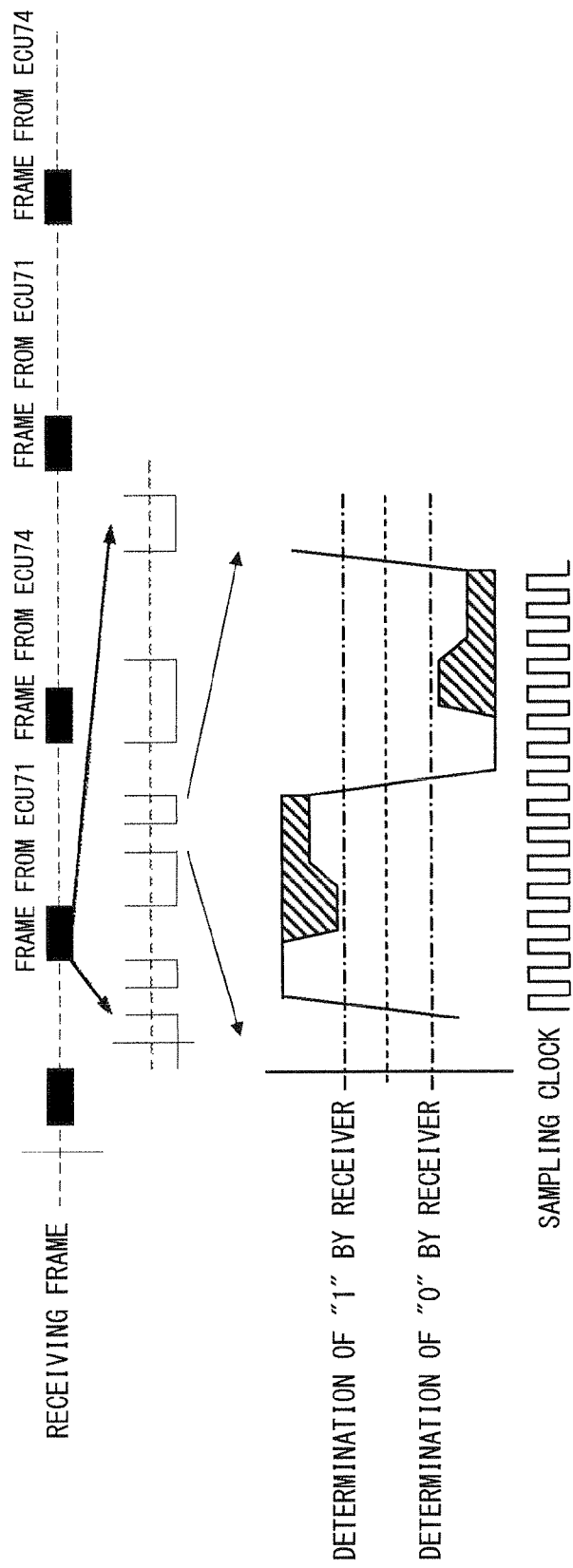
FIG. 6B is an explanatory view of switching a waveform shaping parameter depending on a transmitting source at the receiving end of the communication system network illustrated in FIG. 6A.

FIG. 6B is an explanatory view of switching a waveform shaping parameter depending on a transmitting source at the receiving end ECU illustrated in FIG. 6A. It is assumed that the order or the timing of the frames transmitted from the transmitting end ECU received by the receiving end ECU is given. In the example illustrated in FIG. 6B, the frame from the ECU 71 and the frame from the ECU 74 are sequentially received. Each frame is switched to a correction constant for a transmitting source, and the diagonally shaded area of the illustrated waveform is compensated for by a correction constant with an active filter.

An embodiment is described below.

A device for identifying a transmitting source is required at the receiving end, for example. There can be two methods for identifying a transmitting source. One is to have a table indicating the transmission timing (schedule) planned for each transmitting source. This method is effective in a time trigger system in which the transmission timing is scheduled in advance on a network.

Another method is to identify a transmitting source from the identifier of a received frame, and transmit an identifier before transmission frame data. However, to enable an identifier to be transmitted before transmitting data on the similar network, it is used to delay the transmission rate to ignore the waveform degradation by a reflective wave. Therefore, it is a method that may be used in a network in which the time required to transmit an identifier is not the problem in transmitting transmission frame data, for example.

On the basis of the former method in an embodiment described below, the waveform shaping is performed by providing at the receiving end a device for storing the transmission schedule of each transmitting source, a device for monitoring the waveform state and calculating a waveform shaping parameter for each transmitting source, a device for storing a parameter calculated for each transmitting source, and a device for performing waveform shaping by the waveform shaping parameter.

Figure 7A:
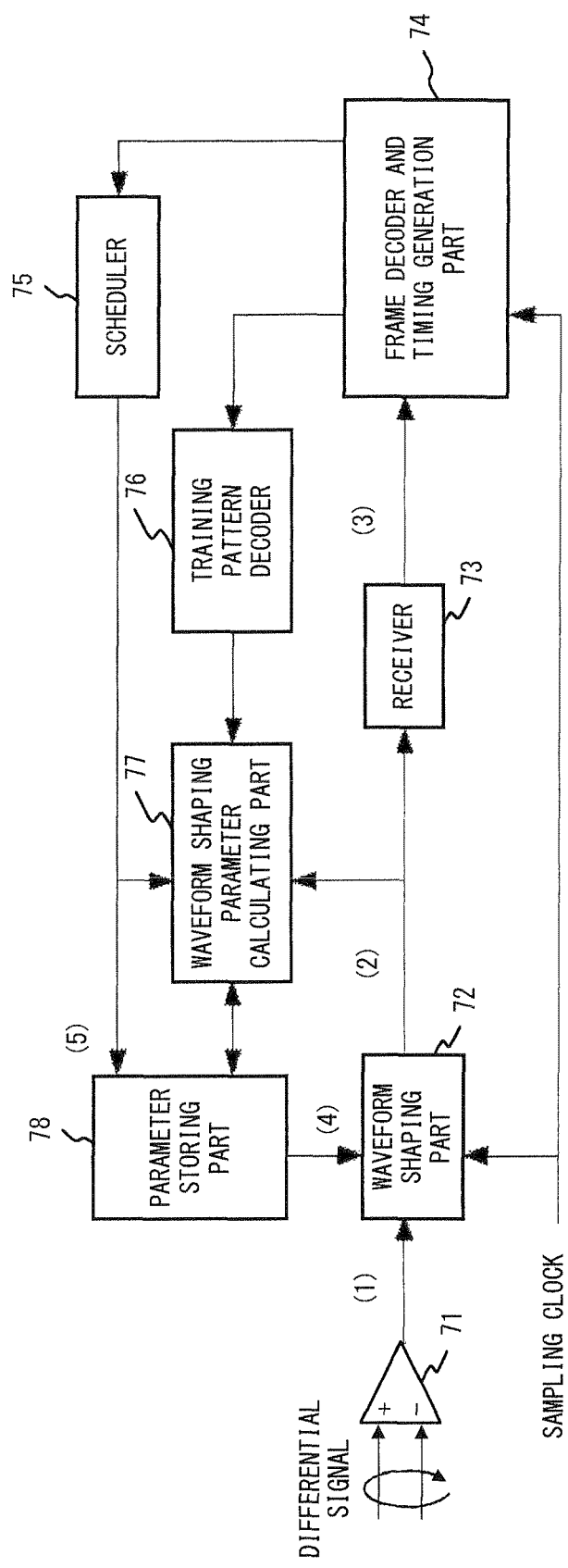
FIG. 7A illustrates an example of a block diagram of the function of the signal receiver apparatus according to an embodiment.
Figure 7B:
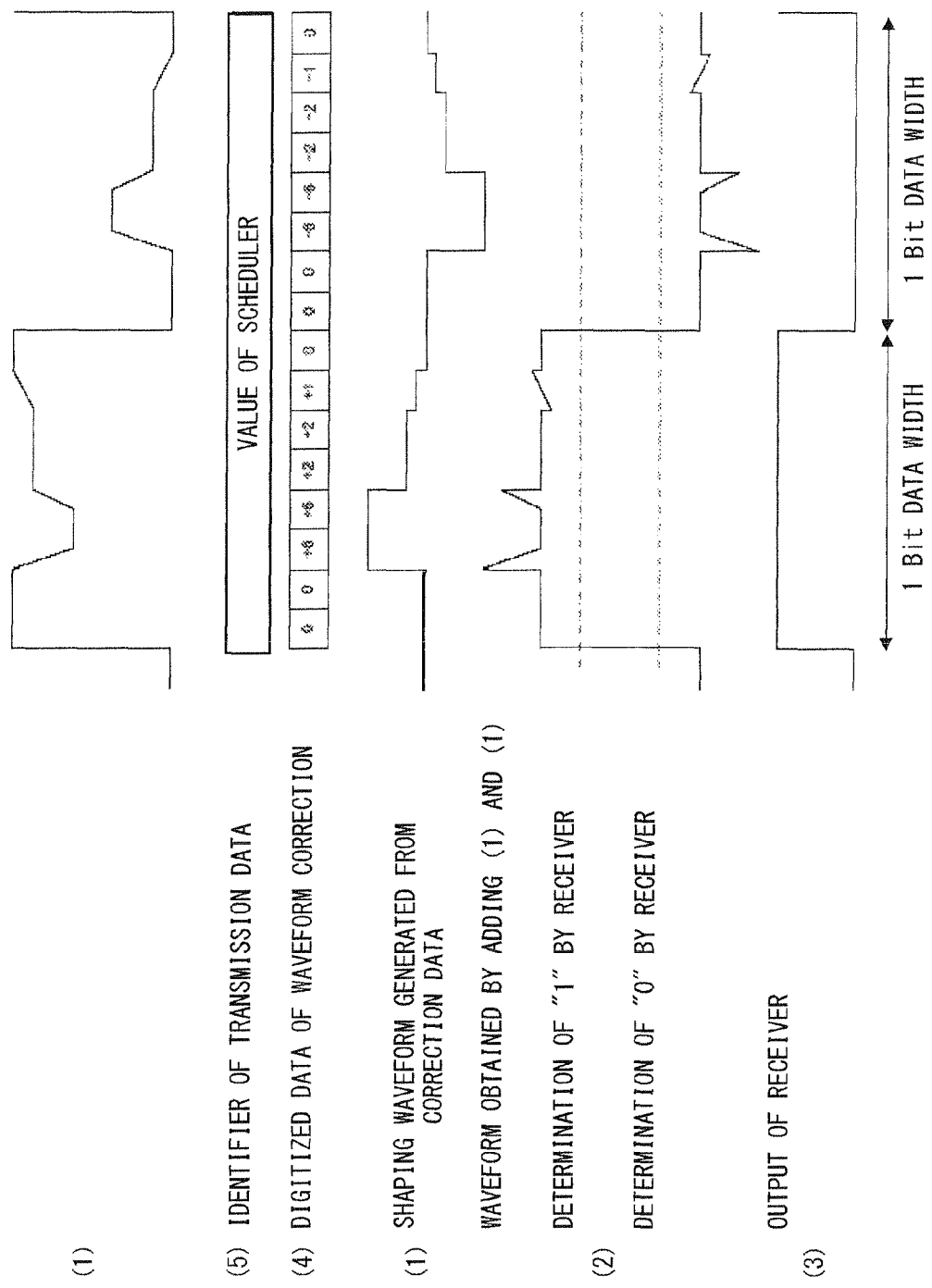
FIG. 7B is an explanatory view of the outline of the waveform shaping by the signal receiver apparatus illustrated in FIG. 7A.

FIG. 7A illustrates an example of a block diagram of the function of the signal receiver apparatus according to an embodiment. FIG. 7B is an explanatory view of the outline of the waveform shaping by the signal receiver apparatus illustrated in FIG. 7A.

The outline of the operation of the signal receiver apparatus is described below with reference to FIGS. 7A and 7B.

A received signal transmitted as, for example, a differential signal through a bus is amplified by a differential amplifier 71 into, for example, the waveform (1) illustrated in FIG. 7B, and input to a waveform shaping part 72.

The waveform shaping part 72 corrects the waveform (1) above using the waveform shaping parameter stored in a parameter storing part 78, and provides the resultant waveform for a receiver 73 and a waveform shaping parameter calculating part 77.

The waveform shaping parameter provided for the waveform shaping part 72 is read from the parameter storing part 78 using as a key the identifier (illustrated as (5) in FIG. 7B) for identification of the transmitting source of the transmission data when the parameter is provided from a scheduler 75 to the parameter storing part 78, and provided as waveform correction data digitized as illustrated in (4) in FIG. 7B. The data is stored in the parameter storing part 78 for each transmitting source, and used again for the similar and next transmitting source.

The waveform shaping part 72 receives the digitized waveform correction data illustrated in (4) in FIG. 7B, and generates a shaping waveform illustrated in (1) in FIG. 7B according to the received data. Next, the input waveform indicated by (1) in FIG. 7B and input from the differential amplifier 71 is added to the above-mentioned shaping waveform, and the waveform indicated by (2) in FIG. 7B is output to the receiver 73.

The receiver 73 makes a "0" or "1" determination depending on the waveform level, and outputs the bit data indicated by (3) illustrated in FIG. 7B. That is, it extracts digital data from an analog waveform. The bit data generated by the receiver 73 is provided for a frame decoder and timing generation part 74.

The frame decoder and timing generation part 74 assembles data and generates timing from a supplied bit data string with the method in accord with a protocol used by the network. The generated frame reception timing is provided for the scheduler 75, and also provides bit string data for a training pattern decoder 76.

The scheduler 75 switches identifiers for identification of the transmitting source of transmission data for each frame reception timing, and provides the switching result for the waveform shaping parameter calculating part 77 and the parameter storing part 78.

The training pattern decoder 76 detects a training pattern on the basis of the provided bit string data, and provides the data update trigger for the waveform shaping parameter calculating part 77.

In the above-mentioned function block, the scheduler 75, the training pattern decoder 76, the waveform shaping parameter calculating part 77, and the parameter storing part 78 is a function block newly introduced by the present embodiment.

The waveform shaping parameter calculating part 77 etc. in the function block of the above-mentioned signal receiver apparatus is described below further in detail.

The waveform shaping parameter calculating part 77 is first described below. The waveform shaping parameter calculating part 77 monitors a change of a waveform amplitude and digitizes the correction data. Since there occurs a shift in waveform shaping when there is a change in influence of the reflection by a change in external environment, the change in waveform amplitude is constantly monitored to correct the amount of the shift.

The process performed by the waveform shaping parameter calculating part 77 is described below in detail with reference to FIGS. 8A through 8D.

FIG. 8A is an explanatory view of the data input/output of the waveform shaping parameter calculating part 77.

The waveform correction data is input from the parameter storing part 78, and the waveform correction update data and the update trigger are output to the parameter storing part 78. The identification information about a transmission node is input from the scheduler 75, and the data update trigger is input from the training pattern decoder 76. The reception waveform (2) illustrated in FIG. 7B is input from the waveform shaping part 72.

Figure 8B:
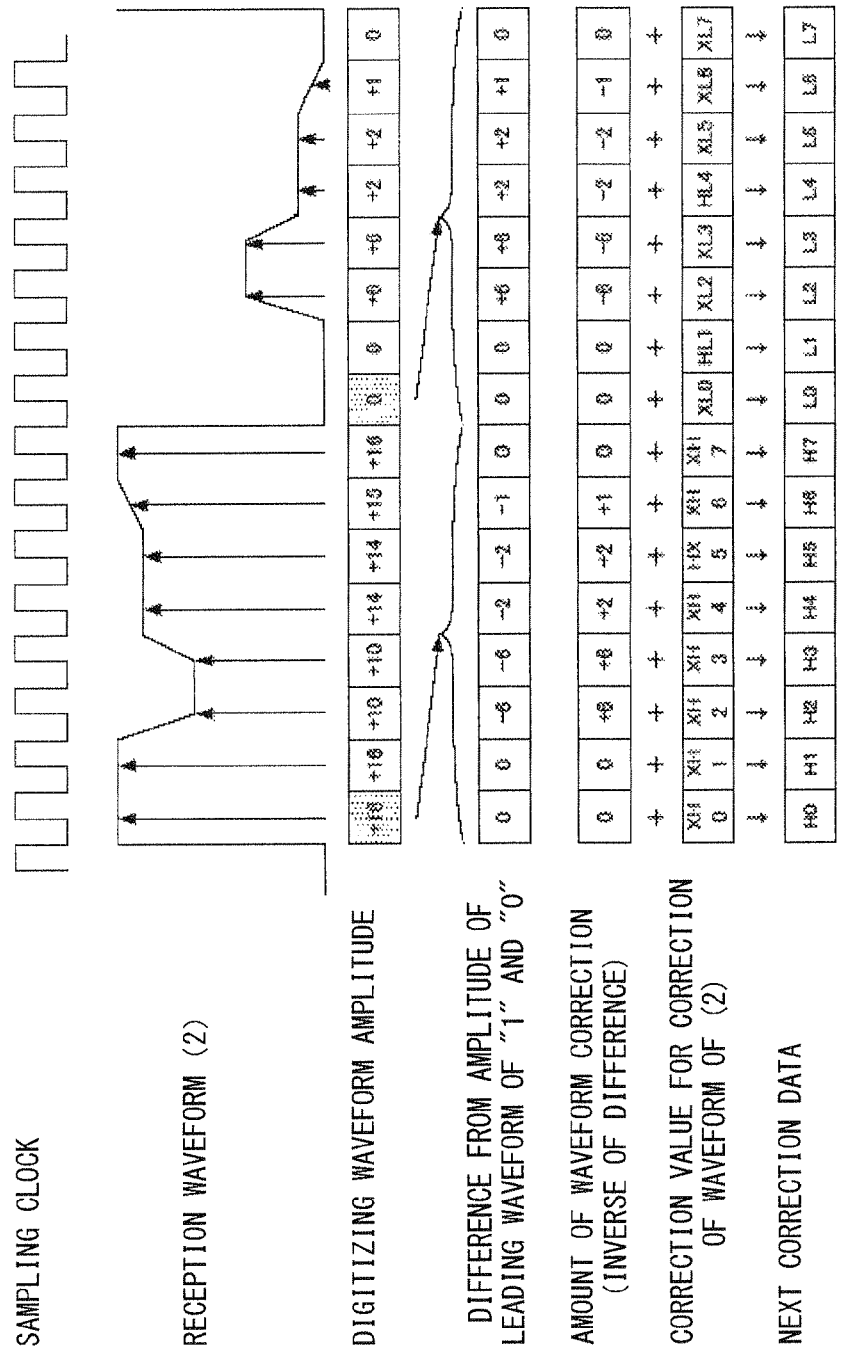
FIG. 8B illustrates the transition of the data processed by the waveform shaping parameter calculating part.

FIG. 8B illustrates the transition of the data processed by the waveform shaping parameter calculating part 77.

The received waveform (2) is sampled by a sampling clock, and the waveform amplitude is digitized. In the example illustrated in FIG. 8B, a 1-bit waveform is sampled by eight sampling clocks, and a sampling value, +16, +16, +10, etc. are obtained from the leading part of the bit value "1".

Next, the difference from the sampling value of the leading waveform of the bit values "1" and "0" is calculated. In the example illustrated in FIG. 8B, 0, 0, −6, etc. are obtained.

In the above-mentioned operation, 1-bit data is identified by plural times of sampling operations and the amount of distortion is digitized. When the waveform data is extracted by eight times of oversampling on the reception waveform as described above, it is assumed that the subsequent eight times of sampling indicate the similar bit values on the basis of the first "1" or "0" level point. At this time, the change of the waveform amplitude from the distortion of the waveform is stored for each sampling process.

Next, the inverse (value obtained by inverting the sign) of the difference is obtained as an amount of correction of the waveform correction data. From the inverse of the difference and the current waveform correction data XH0, XH1, XH2, . . . input from the parameter storing part 78 are added up to obtain the correction value for correcting the reception waveform (2), and stored in the parameter storing part 78 as the next correction data H0, H1, H2, . . . . The "H" in XH0, H0, etc. indicates a correction value of a bit, and the numeral such as 0 etc. indicates the sampling order.

When there is a data update trigger by a specific pattern from the training pattern decoder 76, the waveform shaping parameter is updated.

When shaping data is calculated from the waveform of received data, the function of digitizing the amplitude of a reception waveform is required, for example. A comparator is also required to identify the distortion of the waveform in addition to identifying "1" and "0" of received data, for example. A change of a waveform amplitude can be digitized by an analog-to-digital converter (ADC), or a given amplitude level can be compared by a comparator. In this example, a fluctuation value of an amplitude is measured and a held amplitude level is digitized.

Figure 8C:
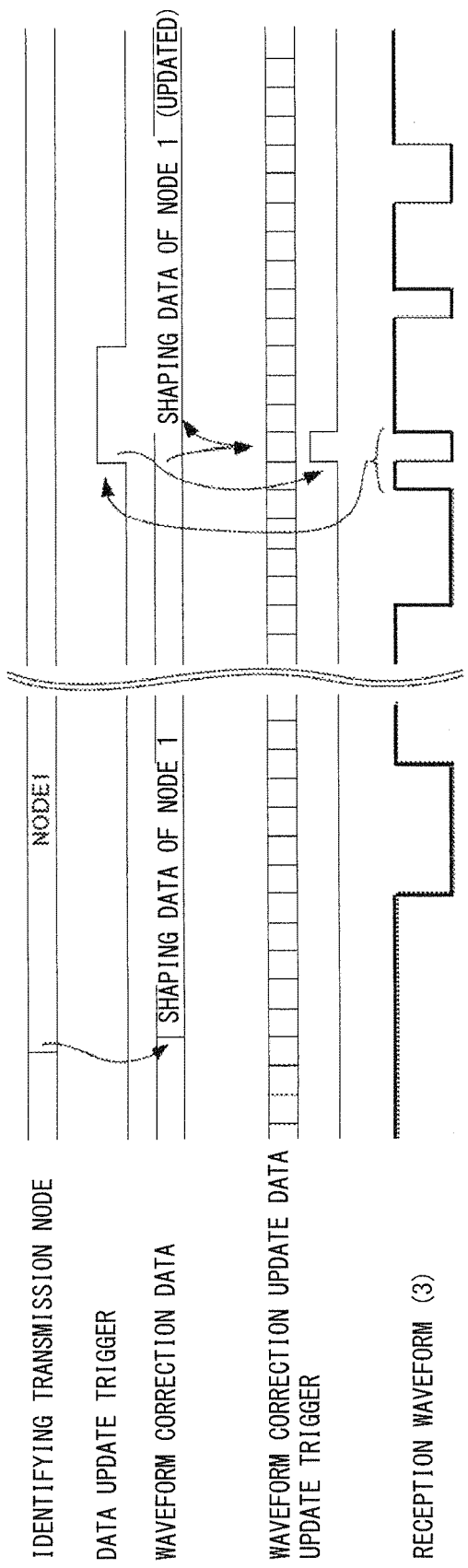
FIG. 8C is an explanatory view of the updating operation of the waveform correction data.

FIG. 8C is an explanatory view of an operation of updating waveform correction data.

In the example illustrated in FIG. 8C, the training pattern is set as "10". If the training pattern decoder 76 detects the pattern "10" from the reception waveform (3) as the output of the receiver 73 as illustrated in FIG. 8C, then the training pattern decoder 76 outputs a data update trigger to the waveform shaping parameter calculating part 77.

If the scheduler 75 outputs the node 1 as the identification information about a transmission node, the waveform correction data of the node 1 is used.

When the waveform shaping parameter calculating part 77 receives the data update trigger, it obtains the waveform correction update data of the node 1 corrected as illustrated in FIG. 8B, the update trigger is output to the parameter storing part 78, and the waveform correction data of the node 1 stored in the parameter storing part 78 is updated.

Figure 8D:
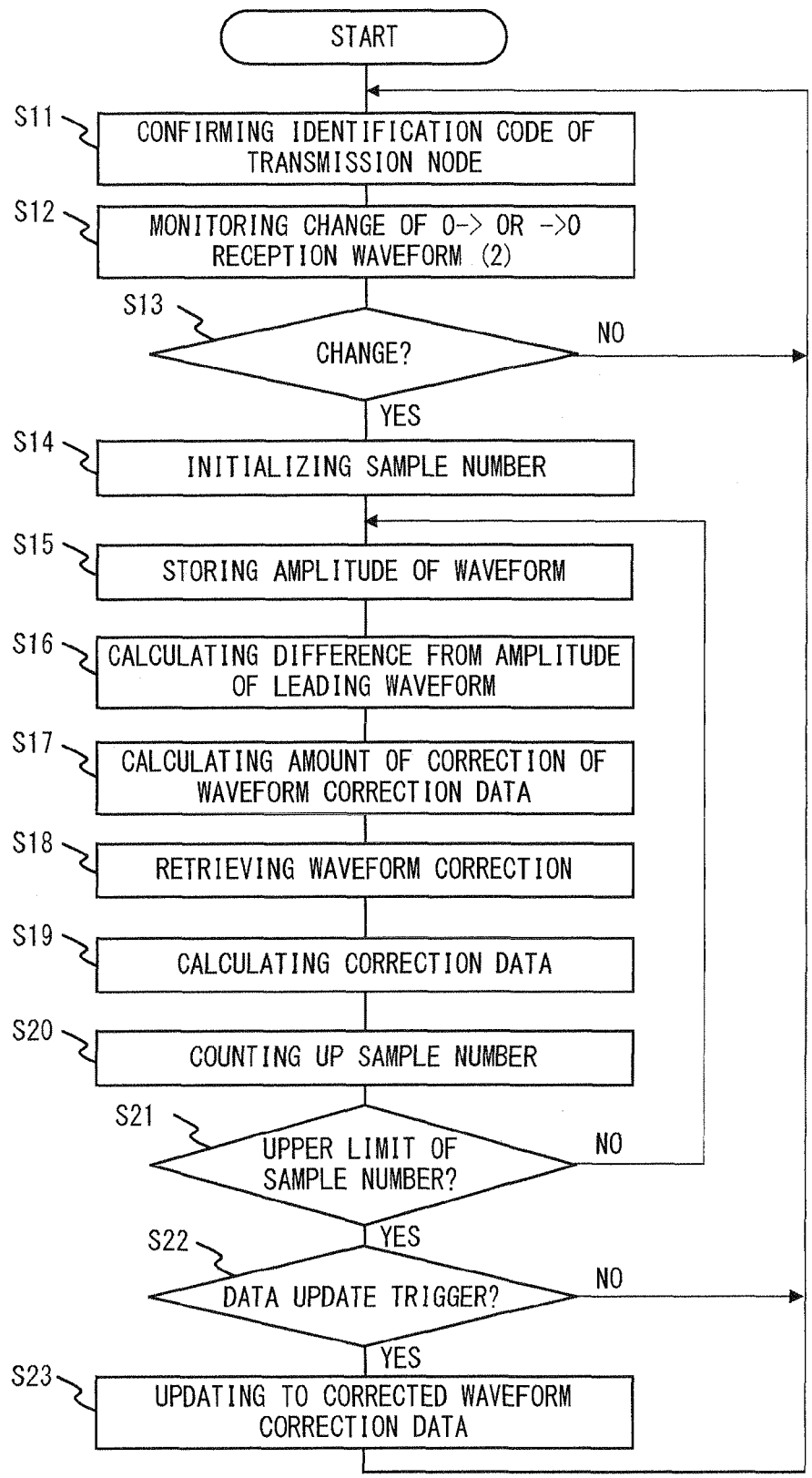
FIG. 8D is an explanatory view of an example of the process flow realized by the waveform shaping parameter calculating part.

FIG. 8D is an explanatory view of an example of the process flow executed by the waveform shaping parameter calculating part 77. The process flow can be executed by the program of the computer that realizes the waveform shaping parameter calculating part 77.

First, in operation S11, an identification code value is received, and the identification code of the transmission node is confirmed. Next, in operation S12, a change from the rising from "0" of the reception waveform (2) or the falling from "0" is monitored. Control is returned to operation S11 if there is no change as a result of the change/no-change determination in operation S13. The processes in operations S12 and S13 are to monitor the reception waveform (2) after the shaping from the waveform shaping part 72.

If there is a change, control is passed to operation S14, and the sample number is initialized. A sample number refers to a number indicating the sampling order for one transmission bit. In the illustration in FIG. 8B, the numbers are, for example, 0 through 7. Then, the amplitude of the waveform is stored in operation S15. Next, in operation S16, the difference from the amplitude of the leading waveform is calculated. The processes in operations S15 and S16 are to digitize the waveform amplitude illustrated in FIG. 8B and observe the difference from the amplitude of the leading waveform.

Next, the amount of correction of the waveform correction data is calculated by inverting the sign of the difference in operation S17. In addition, in operation S18, the waveform correction data for one sample corresponding to the current sample number of the transmission node having the identification code confirmed in operation S11 is retrieved from the parameter storing part 78.

Next, in operation S19, the correction data illustrated in FIG. 8B is calculated, the sample number is counted in operation S20, and it is determined in operation S21 whether or not the upper limit of the sample number has been reached. If the upper limit has not been reached, control is returned to operation S15, and the processes in operations S15 through 21 are repeated for each sampling clock.

If the sample number has reached the upper limit, control is passed to operation S22, it is determined whether or not the data update trigger is input from the training pattern decoder. If the determination is NO, control is returned to operation S11. If the determination is YES, the waveform correction data calculated for each sample in operation S19 is stored in operation S23, and control is returned to operation S11.

Described below is the parameter storing part 78. The parameter storing part 78 stores for each transmission node the reflective waveform correction data for each transmission node calculated by the waveform shaping parameter calculating part 77, and outputs waveform shaping data corresponding to the transmission node specified by the scheduler 75. Then, the data is updated only when the update trigger is received from the waveform shaping parameter calculating part 77.

Figure 9A:
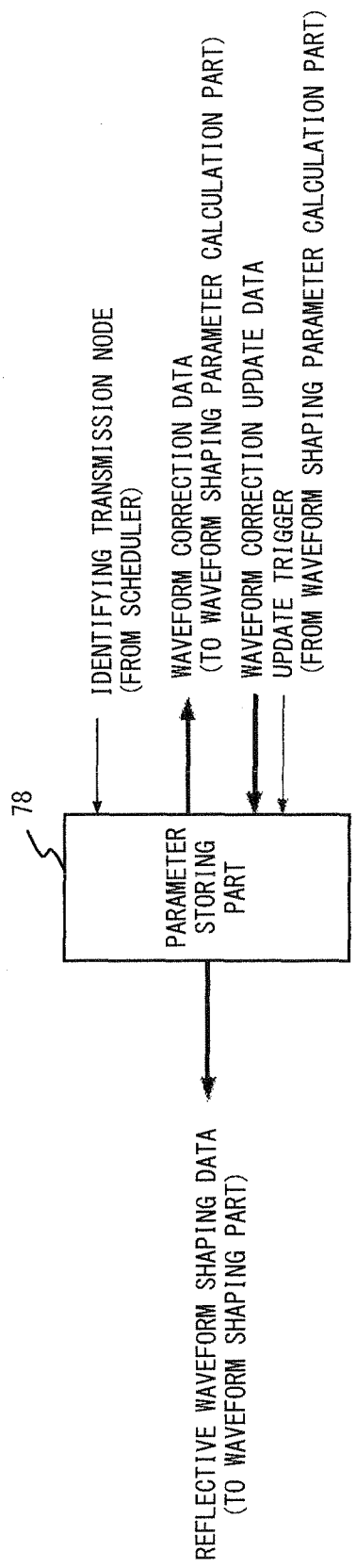
FIG. 9A is an explanatory view of the data input/output of the parameter storing part.

FIG. 9A is an explanatory view of the data input/output in the parameter storing part 78.

The parameter storing part 78 outputs the waveform correction data to the waveform shaping parameter calculating part 77, and receives the waveform correction update data and the update trigger from the waveform shaping parameter calculating part 77. The reflective waveform shaping data is output to the waveform shaping part 72.

Figure 9B:
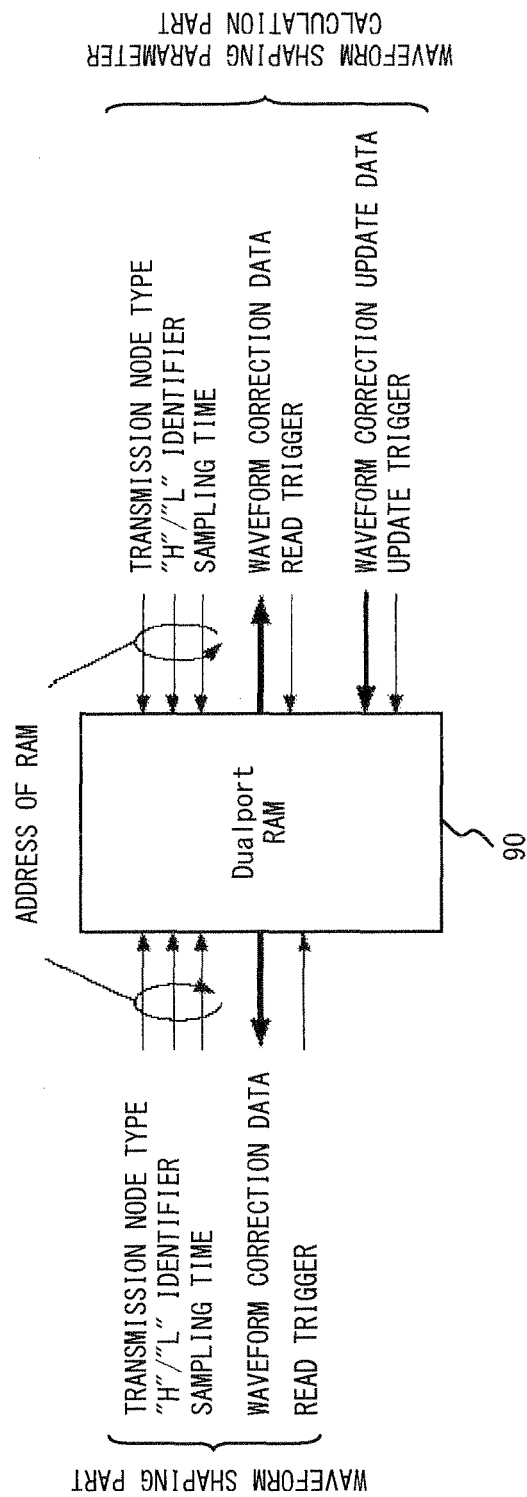
FIG. 9B illustrates an example of a practical configuration of the parameter storing part.

FIG. 9B illustrates an example of a practical configuration of the parameter storing part 78. FIG. 9C illustrates an example of the format of the waveform shaping data.

In the example illustrated in FIG. 9B, the parameter storing part 78 is configured by a dual port RAM 90. The waveform shaping data is stored in the format illustrated in FIG. 9C. That is, the waveform correction data is stored at each of eight sampling times depending on the H/L level for each transmission node. Therefore, the type of transmission node, the "H"/"L" identifier, and the sampling time can be used as the address of the dual port RAM 90.

Since the parameter storing part 78 is configured by the dual port RAM 90, the waveform shaping part 72 outputs a read trigger, specifies as an address the type of transmission node, the "H"/"L" identifier, and the sampling time to read the waveform shaping data, and the waveform shaping parameter calculating part 77 concurrently specifies the address, outputs the read trigger to read the waveform correction data, and outputs the update trigger to write the waveform correction update data.

Described next is the waveform shaping part 72.

The waveform shaping part 72 applies the waveform shaping data calculated by the waveform shaping parameter calculating part to the reception waveform, and shapes the waveform.

Figure 10A:
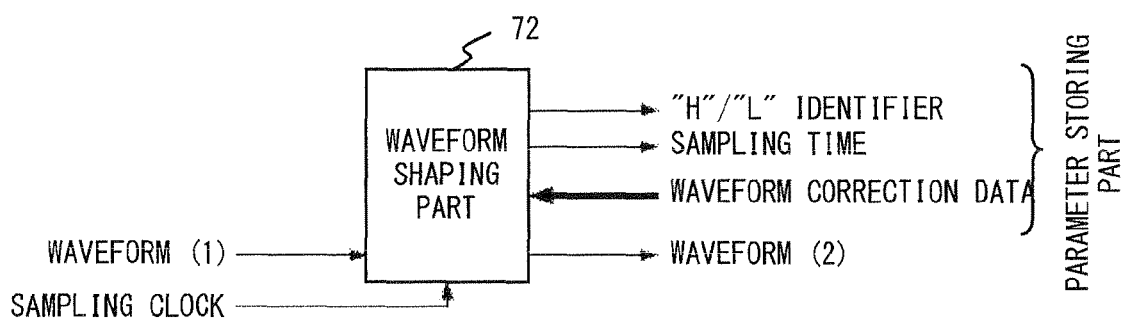
FIG. 10A is an explanatory view of the data input/output of the waveform shaping part.

FIG. 10A is an explanatory view of the data input/output of the waveform shaping part 72.

The waveform shaping part 72 receives the waveform (1) from the differential amplifier 71 illustrated in FIG. 7A, and the waveform shaping part 72 outputs the waveform (2) after the waveform shaping. In addition, it provides the parameter storing part 78 with an "H"/"L" identifier and sampling time as a lower order address to obtain waveform correction data.

Figure 10B:
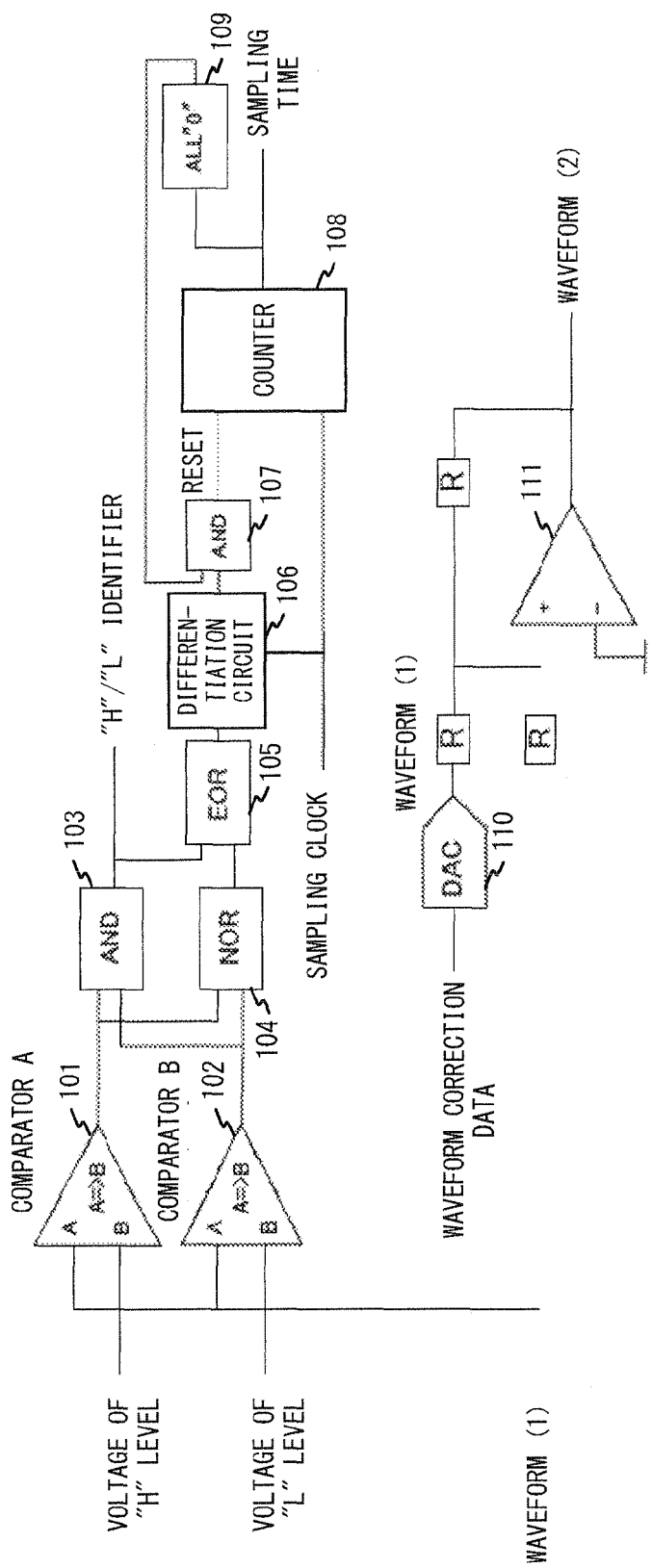
FIG. 10B is an explanatory view of an example of a practical configuration of the waveform shaping part.

FIG. 10B is an explanatory view of an example of a practical configuration of the waveform shaping part 72.

The waveform (1) is input to the input terminal A of a comparator A101, and the voltage of an "H" level is applied to an input terminal B. The waveform (1) is input to the input terminal A of the comparator B102, and the voltage of an "L" level is applied to the input terminal B.

The output of the comparator A101 and output of the comparator B are respectively coupled to the input terminals of an AND circuit 103 and a NOR circuit 104.

The output of the AND circuit 103 is an "H"/"L" identifier, and coupled to one input terminal of an EOR circuit 105, and the output of the NOR circuit 104 is coupled to another input terminal of the EOR circuit 105. The output of the EOR circuit 105 is coupled to the input terminal of a differentiation circuit 106.

The output of the differentiation circuit 106 is coupled to one input terminal of an AND circuit 107, and the output of the AND circuit 107 is provided as reset input for a counter 108.

The counter 108 is, for example, a 3-bit counter for counting a sampling clock, and outputs a count value as sampling time. An ALL "0" detection circuit is coupled to the counter 108, and outputs a detection signal to another input terminal of the AND circuit 107 when it is detected that the count value of the counter 108 becomes 0.

The waveform (1) input from the differential amplifier 71 is shaped into the waveform (2) by an amplifier 111 using the waveform (1)' transformed by a DAC 110 from the waveform correction data input from the parameter storing part 78.

Figure 10C:
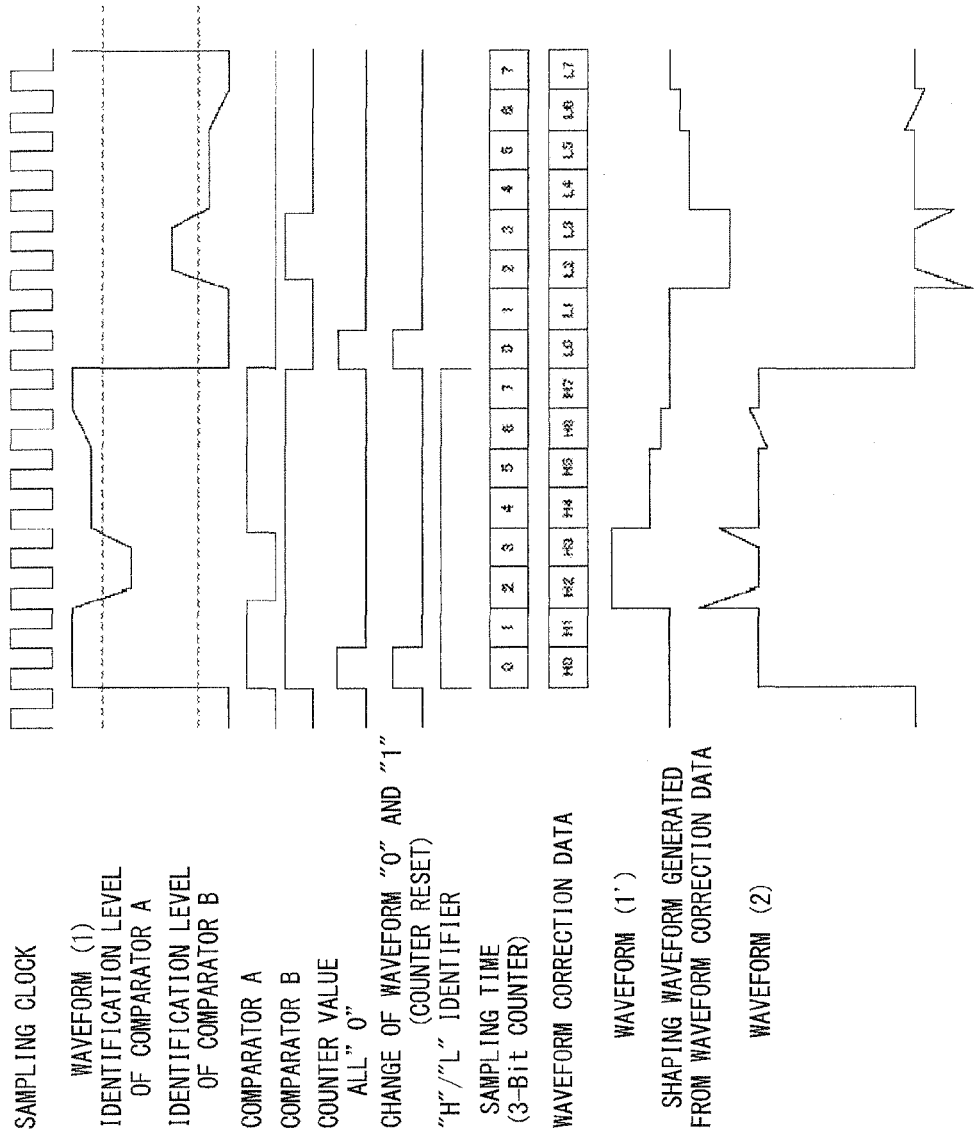
FIG. 10C is an explanatory view of an operation of an example of a practical configuration of the waveform shaping part.

FIG. 10C is an explanatory view of the operation of an example of a practical configuration illustrated in FIG. 10B.

The waveform (1) input from the differential amplifier 71 is level-identified by the comparator A101 and the comparator B102 for each sampling clock, and a level comparison result is output. An "H"/"L" identifier is obtained on the basis of the comparison result. Additionally, the count value of the counter 108 is defined as sampling time, and the waveform correction data is sequentially retrieved from the parameter storing part 78 using the sampling time and the "H"/"L" identifier.

Then, the shaping waveform (1)' is generated from the waveform correction data, and the waveforms (1) and (1)' are added up to obtain the waveform (2) and then the resultant waveform is output.

Described next is the training pattern decoder 76.

As described above with reference to FIG. 7A, the training pattern decoder 76 detects a training pattern on the basis of the provided bit string data, and provides the waveform shaping parameter calculating part 77 with a data update trigger. What bit string pattern is detected and assigned a data update trigger is illustrated in the embodiments 1 and 2 described below.

The condition of generating a reflection in a transmission line is a change of "0"→"1" or a change of "1"→"0" in the transmission data. No reflection occurs while the similar state such as "000 . . . " "111 . . . ", etc. continues.

If the convergence time of a reflective waveform causing the distortion of a waveform is one transmission data bit or less, a waveform shaping operation is to be performed in one data bit period when a change of data "1" to "0" or "0" to "1" occurs. When there is the convergence time of a reflective waveform causing the distortion of a waveform of two transmission data bit or more, the waveform shaping operation is to be performed with the influence of the past change of a transmission data bit taken into account.

Therefore, the training pattern to be detected by the training pattern decoder 76 depends on the convergence time in a transmission line. In addition, the necessity of the waveform shaping changes correspondingly.

To follow the state change of a network, it is used to constantly monitor an amount of a transform of a waveform. Therefore, it is desired that the training pattern decoder 76 extracts an all "1" pattern and an all "0" pattern for the convergence time or longer relative to the convergence time of the reflective wave relating to the degradation of the current waveform, allows the waveform shaping parameter calculating part 77 to monitor the state of the waveform of the transmission bit in the region for the convergence time or longer to follow the state change of the network.

Described below are the embodiments 1 through 3.

The embodiment 1 performs waveform shaping only at the receiving end in the convergence time of the reflective waveform causing the distortion of a waveform within one transmission data bit.

The embodiment 2 performs waveform shaping only at the receiving end in the convergence time of the reflective waveform causing the distortion of a waveform for two transmission data bits or more.

The embodiment 3 performs waveform shaping also at the transmitting end.

Figure 11:
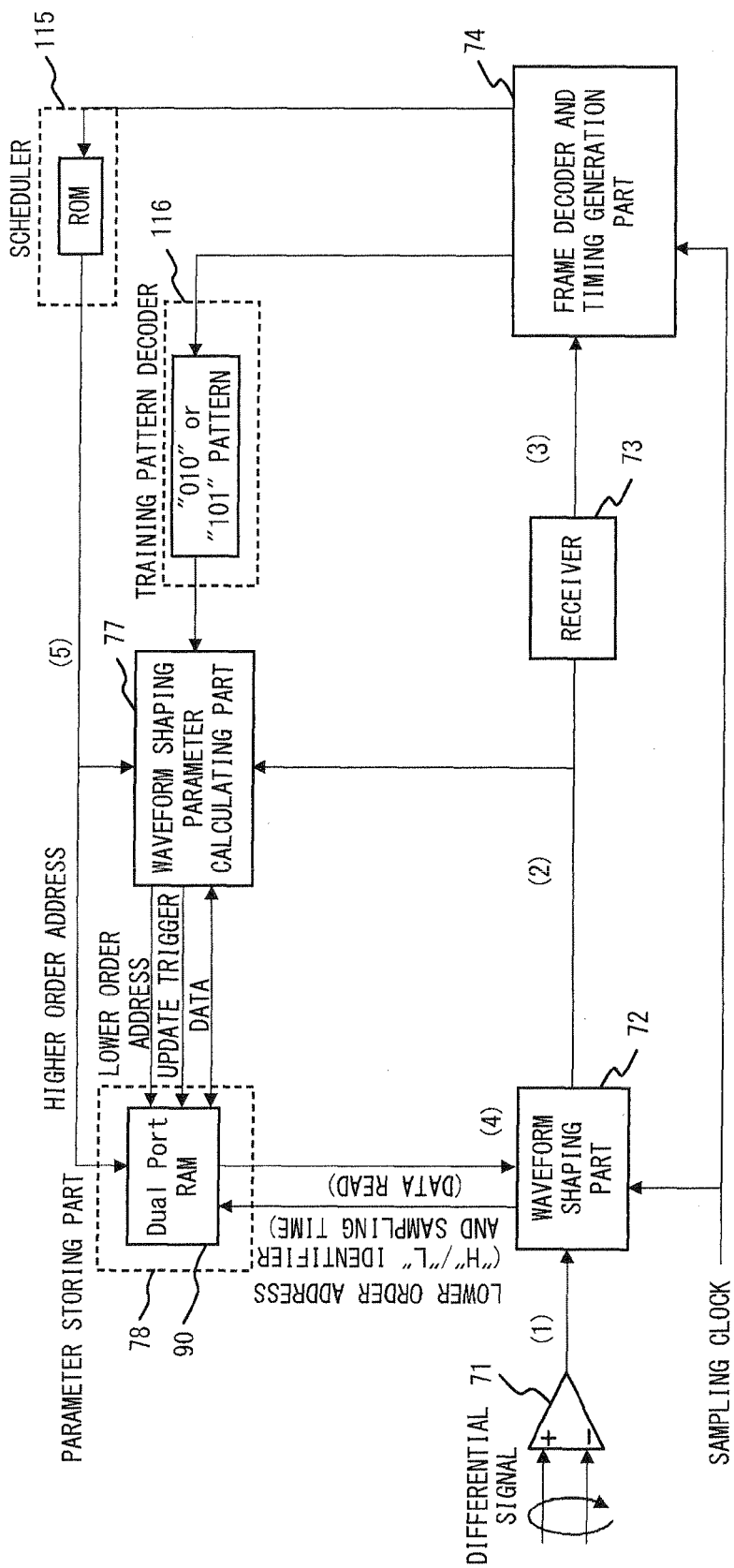
FIG. 11 is a block diagram of the function of the signal receiver apparatus according to an embodiment 1.

FIG. 11 is a block diagram of the function of the signal receiver apparatus according to the embodiment 1. It is substantially the similar at the block diagram of the function illustrated in FIG. 7A. The block diagram of the function assigned the similar reference numeral as FIG. 7A is similar to the block diagram illustrated in FIG. 7A.

A training pattern decoder 116 transmits a data update trigger to the waveform shaping parameter calculating part 77 when a reflective wave pattern by independent bit data such as "010" or "101" is recognized.

A scheduler 115 stores a transmission schedule in advance, and determines the transmitting source of the data to be transmitted next. The transmission schedule is entered in, for example, ROM in advance, and sequentially transmitted to the waveform shaping parameter calculating part 77 and the parameter storing part 78 with the timing of the frame decoder and timing generation part 74 using as an higher order address the identification data corresponding to the next transmission node.

The processing operation of the signal receiver apparatus according to the embodiment 1 configured as described above is similar to that described with reference to FIGS. 7A through 10C.

The waveform shaping parameter calculating part 77 monitors a change of a waveform amplitude as illustrated in FIGS. 8B through 8D, and transmits update data to the parameter storing part 78 when the correction data is to be updated.

The parameter storing part 78 stores the waveform shaping data for each transmission node as illustrated in FIG. 9C, appropriately retrieves each piece of waveform shaping data according to the transmission node identification information from the scheduler 115, and transmits the data to the waveform shaping part 72 and the waveform shaping parameter calculating part 77.

Additionally, by entering in advance the waveform shaping data upon start of the transmission, the convergence time of waveform shaping when the communication is started can be shortened and an erroneous correction of an initially degraded waveform can be avoided.

The waveform shaping part 72 shapes a reception waveform using the waveform shaping data from the parameter storing part 78.

The above-mentioned operations are repeatedly performed, and the waveform shaping illustrated in FIG. 7C is performed, thereby reducing the influence of the reflective waveform.

Next, the embodiment 2 is described with reference to FIGS. 12A through 12D. In the embodiment 2, the reflective waveform has a length of 2 bit data or more.

Figure 12A:
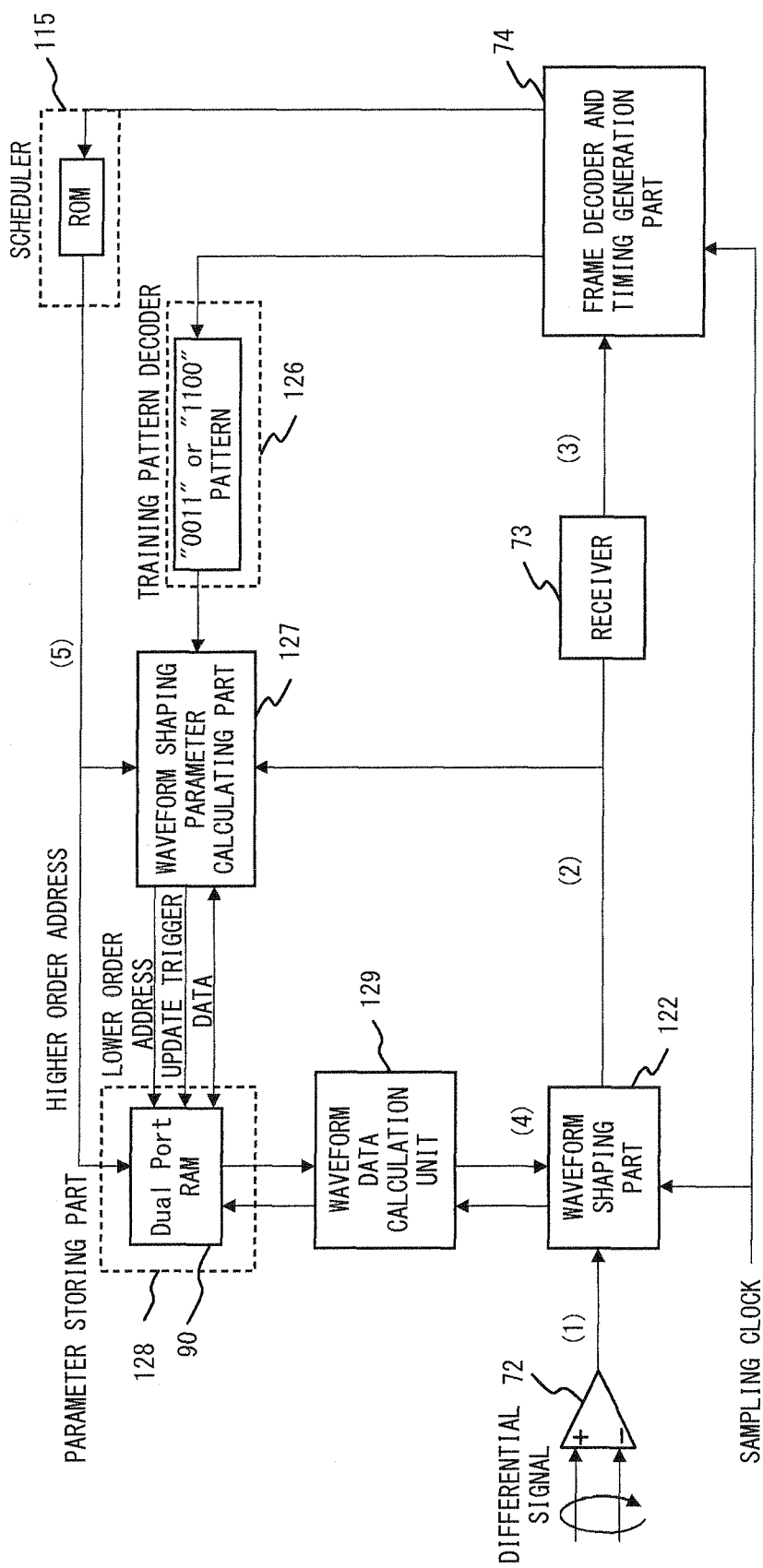
FIG. 12A is a block diagram of the function of the signal receiver apparatus according to an embodiment 2.

FIG. 12A is a block diagram of the function of the signal receiver apparatus according to the embodiment 2. The block diagram of the function assigned the similar reference numeral as the block diagram of the function of the signal receiver apparatus of the embodiment 1 illustrated in FIG. 11 is not different from the block diagram in FIG. 11.

A training pattern decoder 126 detects a pattern corresponding to the convergence time of a reflective waveform. For example, when a reflective waveform affects the reception waveform for the length of 2 bits, it detects a "0011" pattern and a "1100" pattern. Thus, an influence of a single reflective wave appearing by a change of "1"→"0" or "0"→"1" can be captured.

A waveform shaping parameter calculating part 127 calculates the correction data corresponding to the convergence time of a reflective waveform. For example, when the influence continues up to the second bit, the 2-bit data waveform shaping parameter is calculated, and stored in a parameter storing part 128.

In this case, the parameter storing part 128 stores a waveform shaping parameter having a length of 2-bit data.

A waveform data calculation unit 129 is provided as a new function block. When the influence of a reflective waveform continues for a 2 bit length, the waveform data back to the past 2 bits is required, for example. The waveform data calculation unit 129 adds the past waveform shaping data to the current waveform shaping data using the logical value ("H" or "L") of the past 2 bits and the waveform shaping data.

A waveform shaping part 122 provides an "H"/"L" identifier and sampling time, and additionally reports the change information about the waveform "0" and "1".

The function of the waveform data calculation unit 129 is described below in detain with reference to FIGS. 12B through 12D.

Figure 12B:
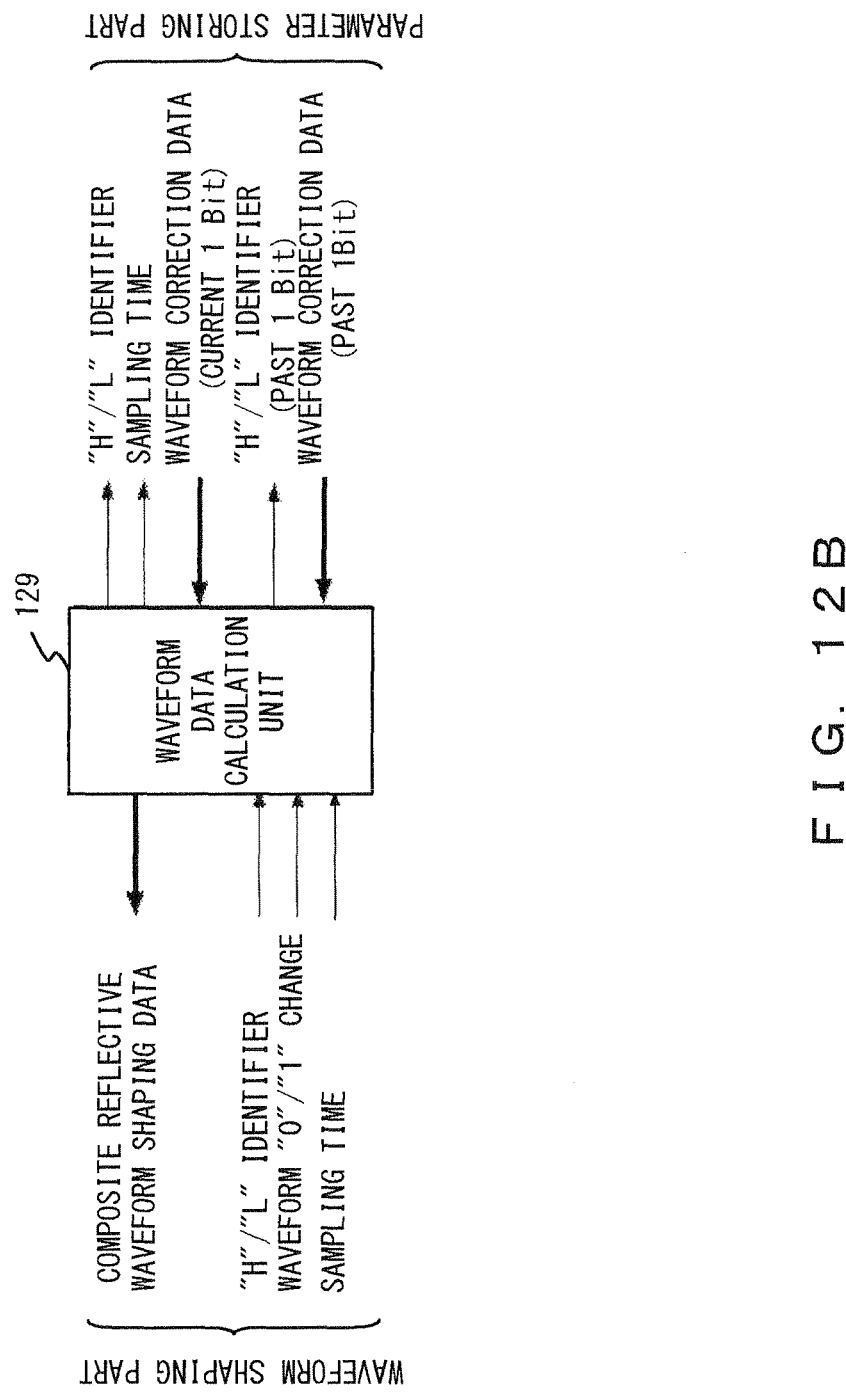
FIG. 12B is an explanatory view of the data input/output of the waveform data calculation unit.

FIG. 12B is an explanatory view of the data input/output of the waveform data calculation unit 129.

The waveform data calculation unit 129 outputs an "H"/"L" identifier and sampling time to the parameter storing part 128, reads the current 1-bit waveform shaping data from the parameter storing part 128, specifies the 1-bit past "H"/"L" identifier, and reads the waveform shaping data corresponding to the influence of the 1-bit past waveform.

The change information about the waveform "0" and "1" is input from the waveform shaping part 122 in addition to the "H"/"L" identifier and sampling time. The reflective waveform shaping data obtained by combining the current data with the past data is output to the waveform shaping part 122.

Figure 12C:
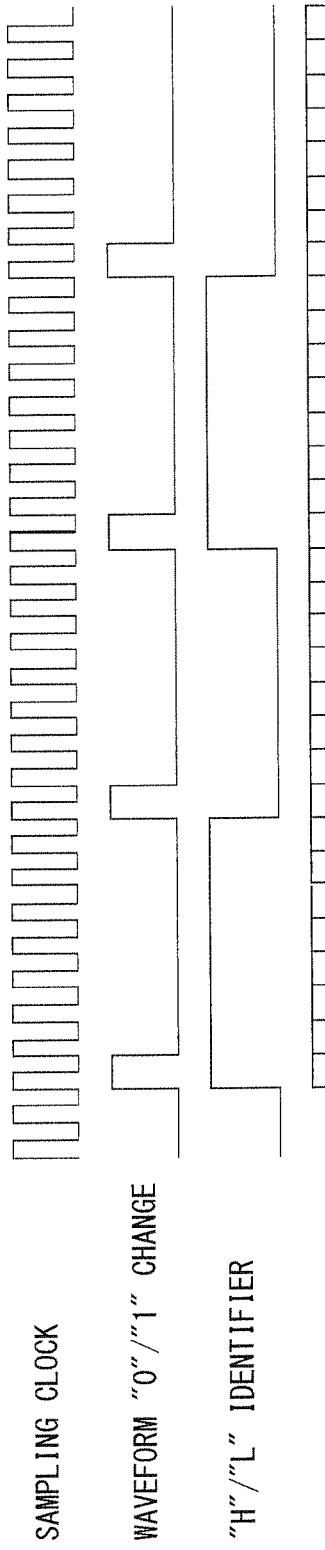
FIG. 12C is an explanatory view of the combination of reflective waveform correction data when the values of the received data repeat "01"
Figure 12C:
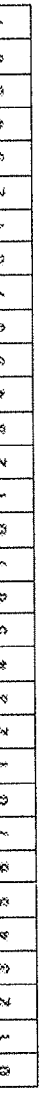

FIG. 12C is an explanatory view of the combined reflective waveform correction data when the value of received data repeats "01". Since the state changes in every bit, a reflective waveform occurs in each bit.

If the change information about the waveform "0" and "1" is input as illustrated in FIG. 12C, and the "H"/"L" identifier is H, then H0, H1, . . . , H7 as the current 1-bit waveform shaping data is read. Simultaneously, X8, X9, . . . , X15 as the past 1-bit waveform shaping data is read. The values of X8, X9, . . . , X15 depend on whether the bit prior to the past bit is H or L. If it is H, the waveform changes from "1" to "0" in the past bit. Therefore, L8, L9, . . . , L15 is obtained. If it is L, there is no state change, and the reflective wave does not occur, thereby obtaining all 0.

A sum of the current 1-bit waveform correction data and the past 1-bit waveform correction data is obtained, and combined reflective waveform correction data A0, A1, . . . , A7 is output to the waveform shaping part 122.

Next, after a bit width has passed, the waveform "0"/"1" change information is input again, and when the "H"/"L" identifier indicates L, the current 1-bit waveform correction data L0, L1, . . . , L7 is read. Simultaneously, the past 1-bit waveform correction data H8, H9, . . . , H15 is read, a sum of the past data and the current 1-bit waveform correction data, that is, A8, A9, . . . , A15, is obtained and output to the waveform shaping part 122. While the value of the received data repeats "01", the above-mentioned operation is repeatedly performed.

Figure 12D:
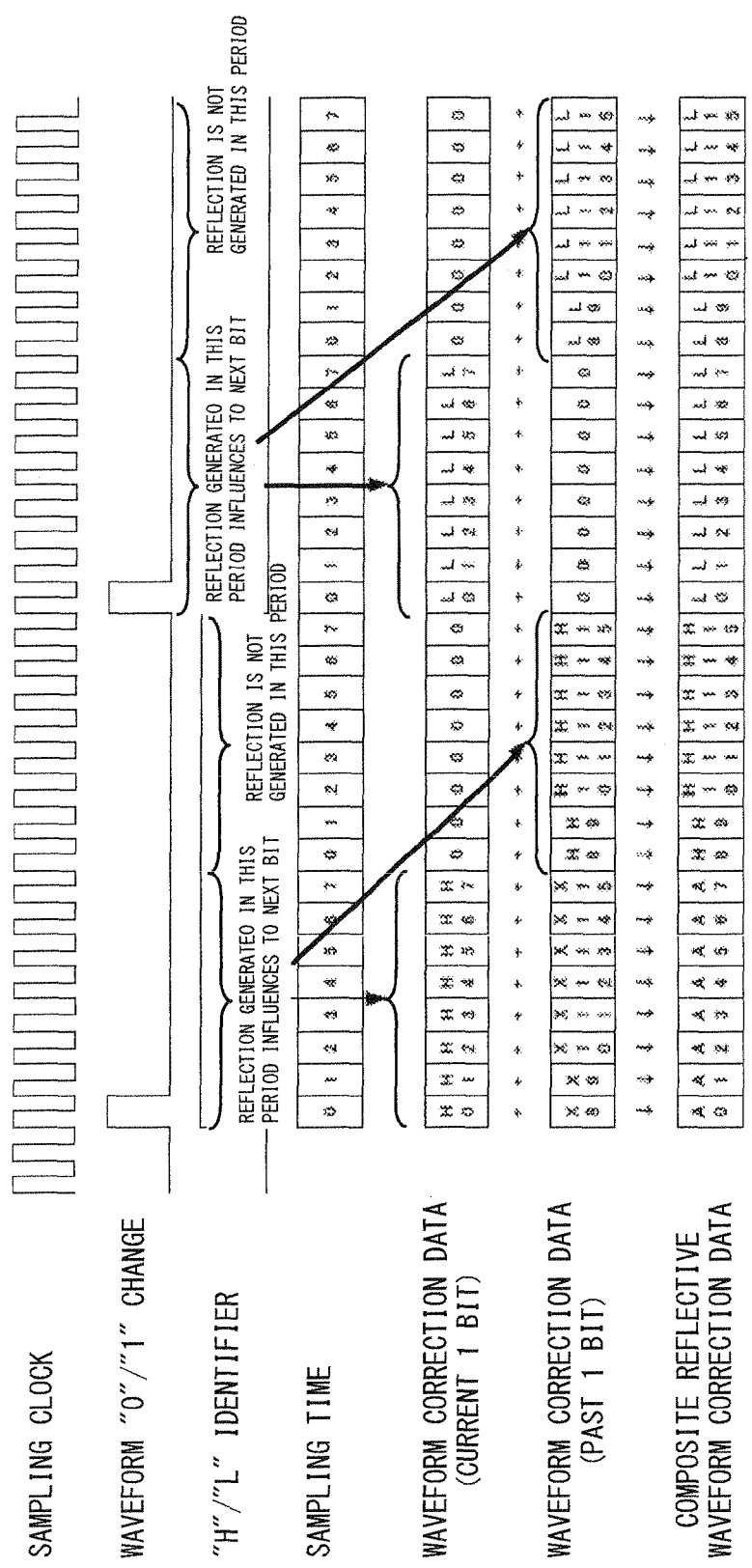
FIG. 12D is an explanatory view of the combination of reflective waveform correction data when the values of the received data repeat "0011"

FIG. 12D is an explanatory view of combining the reflective waveform correction data when the value of the received data repeats "0011". In the bits having the similar consecutive values, the second half bits do not generate reflection, but the influence of the reflection by the first half bits remains in the second half bits, thereby requiring the reflective waveform correction also in the second half bits.

As illustrated in FIG. 12D, if the waveform "0"/"1" change information is input again, and the "H"/"L" identifier indicates H, then the current 1-bit waveform correction data H0, H1, . . . , H7 is read. Simultaneously, the past 1-bit waveform correction data X8, X9, . . . , X15 is read. The operation of the first bit illustrated in FIG. 12D is the similar as the operation of the first bit illustrated in FIG. 12C.

If the "H"/"L" identifier of the second bit is H, and the waveform "0"/"1" change information is not input, then no reflection is generated in the period of the second bit, that is, the current bit. Therefore, the current 1-bit waveform correction data is all 0. On the other hand, since the influence of the reflection generated in the period of the first bit, that is, the preceding bit, remains, the past 1-bit waveform correction data H8, H9, . . . , H15 is read, and the values are output as the combined reflective waveform correction data to the waveform shaping part 122.

In the next bit period, the "H"/"L" identifier is L, and the waveform "0"/"1" change information is input. Therefore, the current 1-bit waveform correction data is L0, L1, . . . , L7, and no reflection is generated in the period of the preceding bit. Therefore, the past 1-bit waveform correction data is all 0, and the combined reflective waveform correction data is L0, L1, . . . , L7.

Since the "H"/"L" identifier of the next bit period is continuously L, as in the case of L, the data is the reflective waveform correction data combined by the reflective waveform shaping data L8, L9, . . . , L15 in the preceding bit period.

Next, the embodiment 3 is described with reference to FIGS. 13A through 13C. The embodiment 3 performs a waveform correction at the transmitting end. By correcting the reflective waveform component and shaping the transmission waveform, the noise temporarily generated on a bus can be reduced. However, when there are a plurality of receiving sources, a correction is, for example d also at the reception ends, and it is performed also with the embodiments 1 and 2.

Figure 13A:
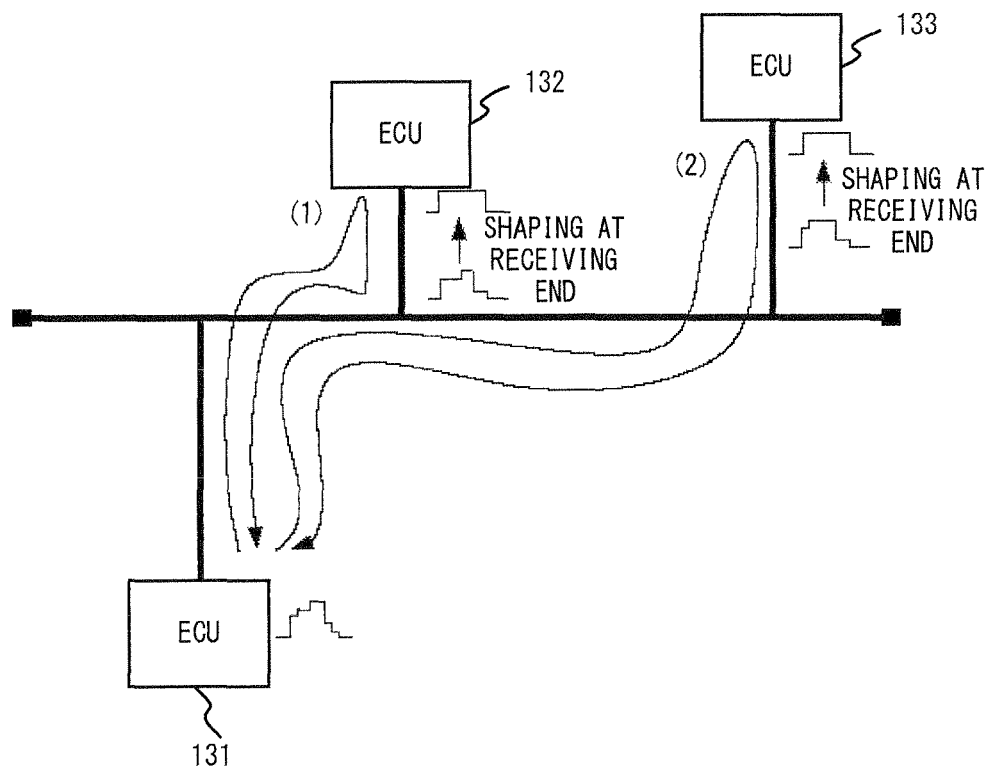
FIG. 13A illustrates an example of a communication system network to which the embodiment 3 is applied.

FIG. 13A illustrates an example of a communication system network to which the embodiment 3 is applied.

Assume that an ECU 131 is a transmitting end, and ECUs 132 and 133 are receiving ends. When the ECU 131 outputs data, the reflective waves are simultaneously corrected through (1) and (2) as illustrated in FIG. 13A.

Figure 1:
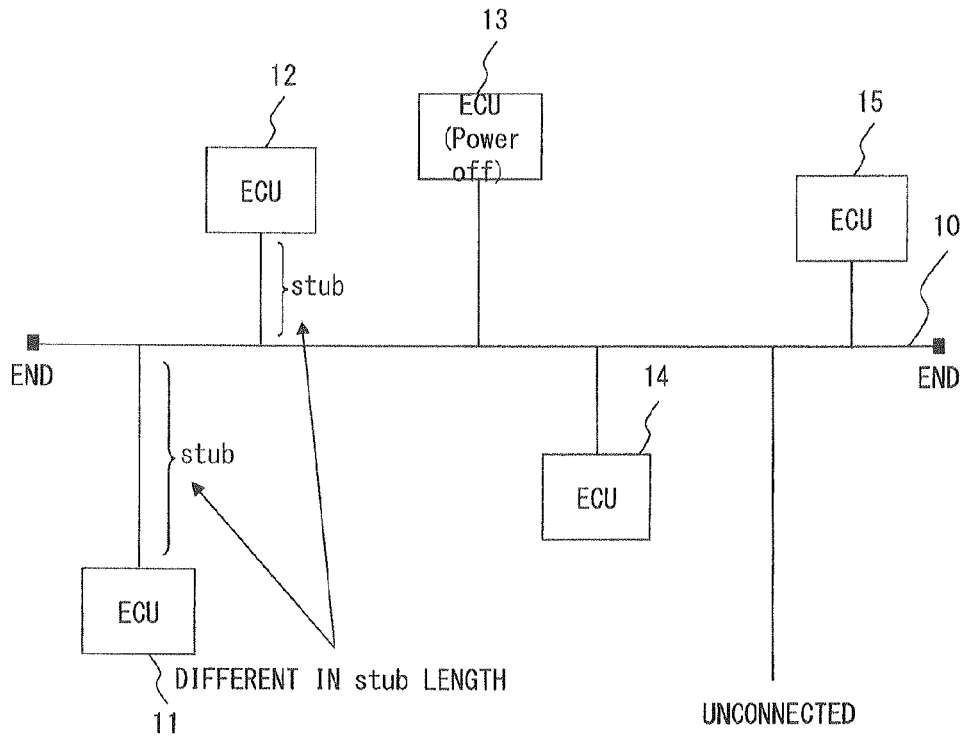
FIG. 1 illustrates an example of a communication system network.
Figure 2:
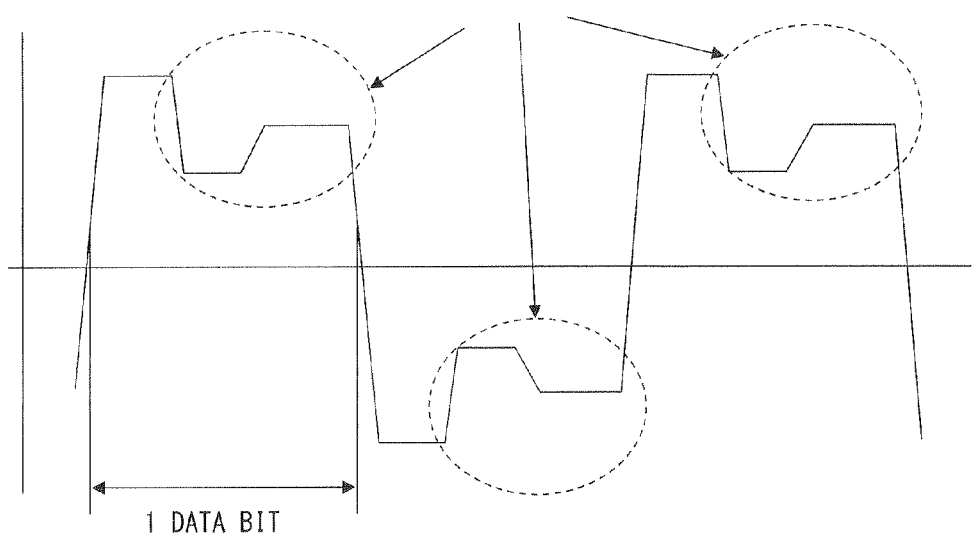
FIG. 2 illustrates an example of a transmission waveform accompanied by waveform degradation in a communication system network.
Figure 3A:
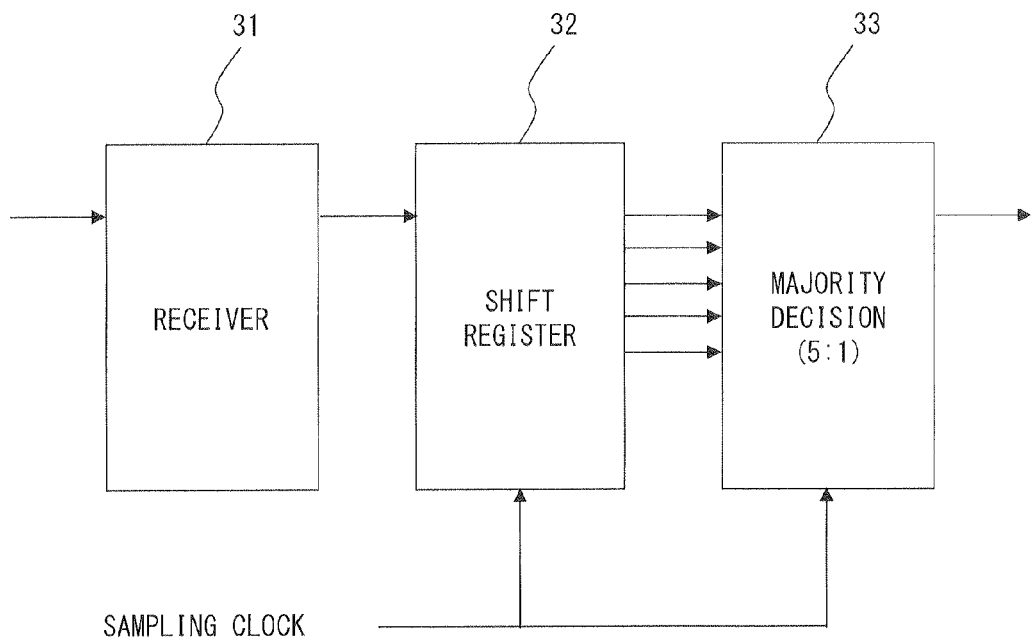
FIG. 3A illustrates an example of a configuration of a circuit for filtering by oversampling and a majority decision circuit.
Figure 3B:
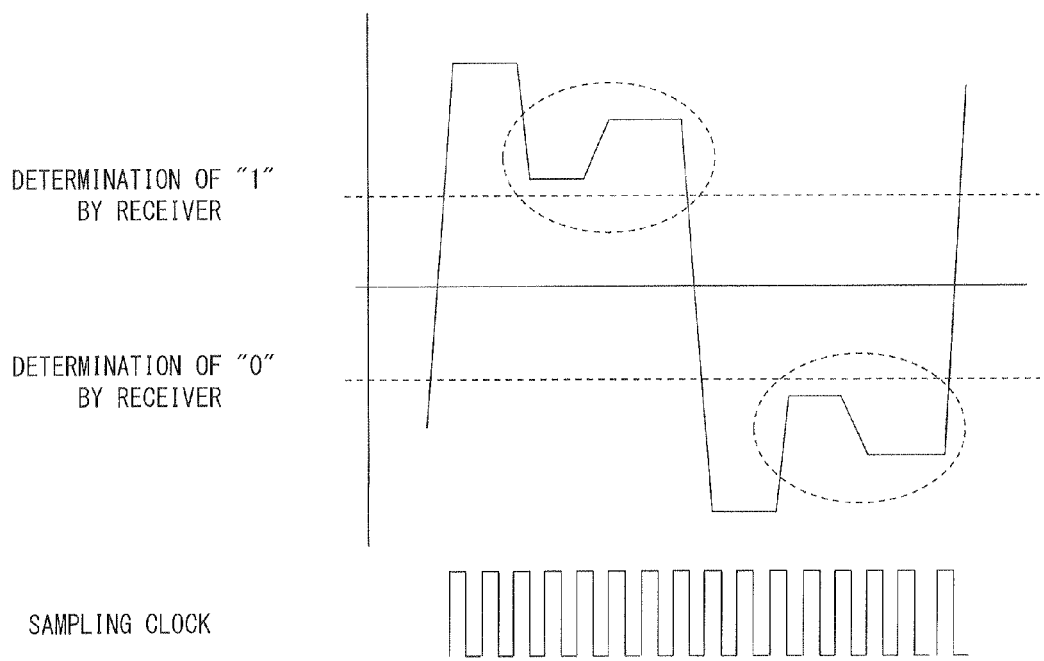
FIG. 3B illustrates the reception waveform of the receiver 31, the determination level of "0" and "1", and a sampling clock.
Figure 3C:
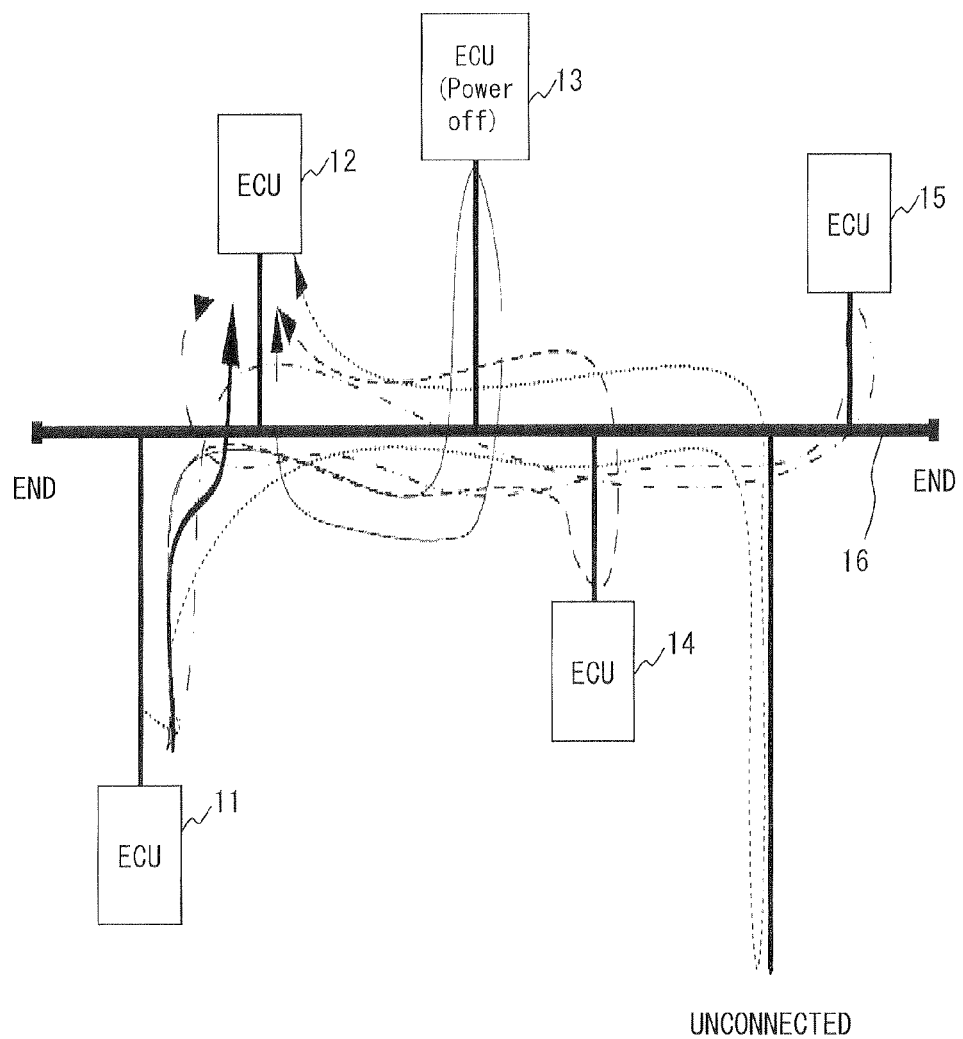
FIG. 3C illustrates a reflective wave superposed on a signal when a signal is transmitted from the ECU 11 to the ECU 12 in the communication system network illustrated in FIG. 1.
Figure 4:
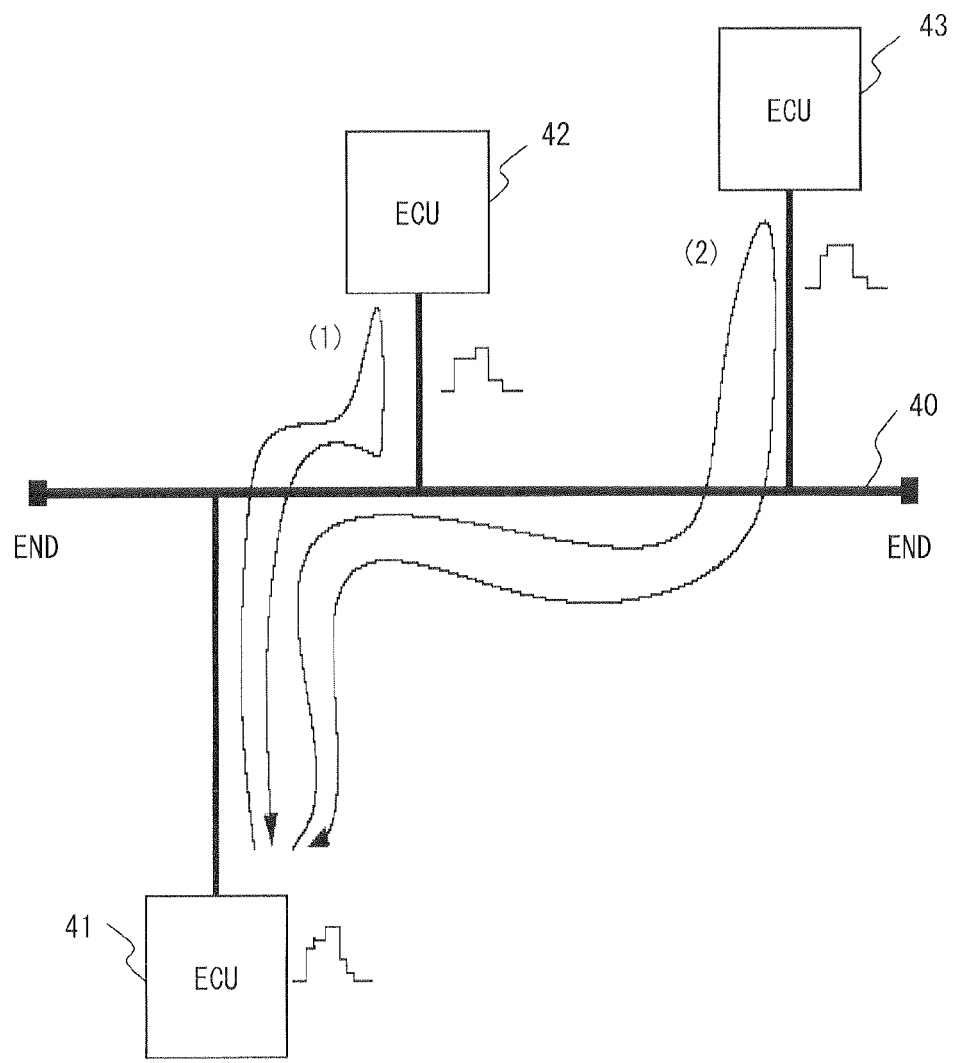
FIG. 4 is an explanatory view of a waveform correction when the first method according to the conventional technology is applied to a bus system in which a plurality of ECUs are coupled.
Figure 5A:
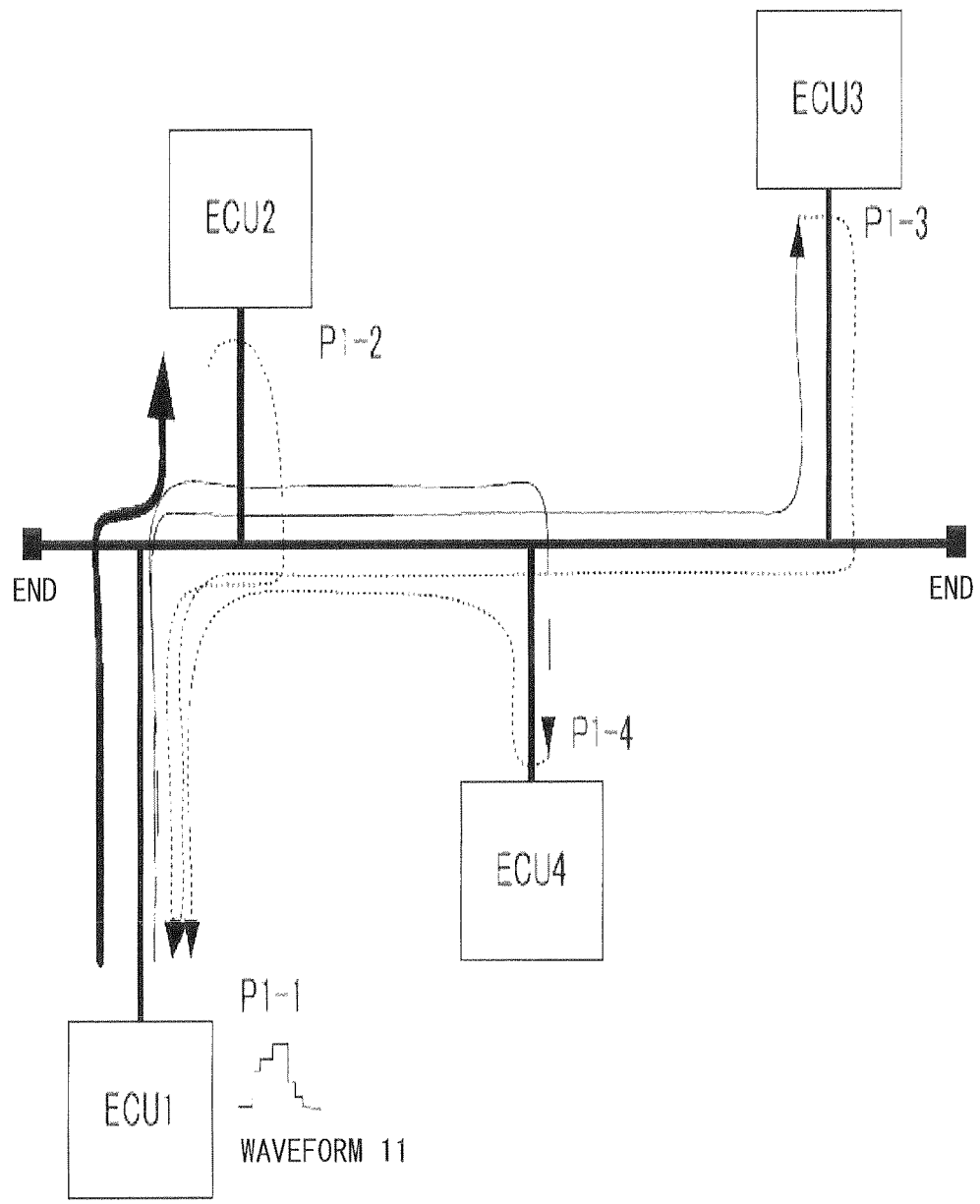
FIG. 5A is an explanatory view of a waveform correction when the second method according to the conventional technology is applied to a bus system in which a plurality of ECUs are coupled.
Figure 5B:
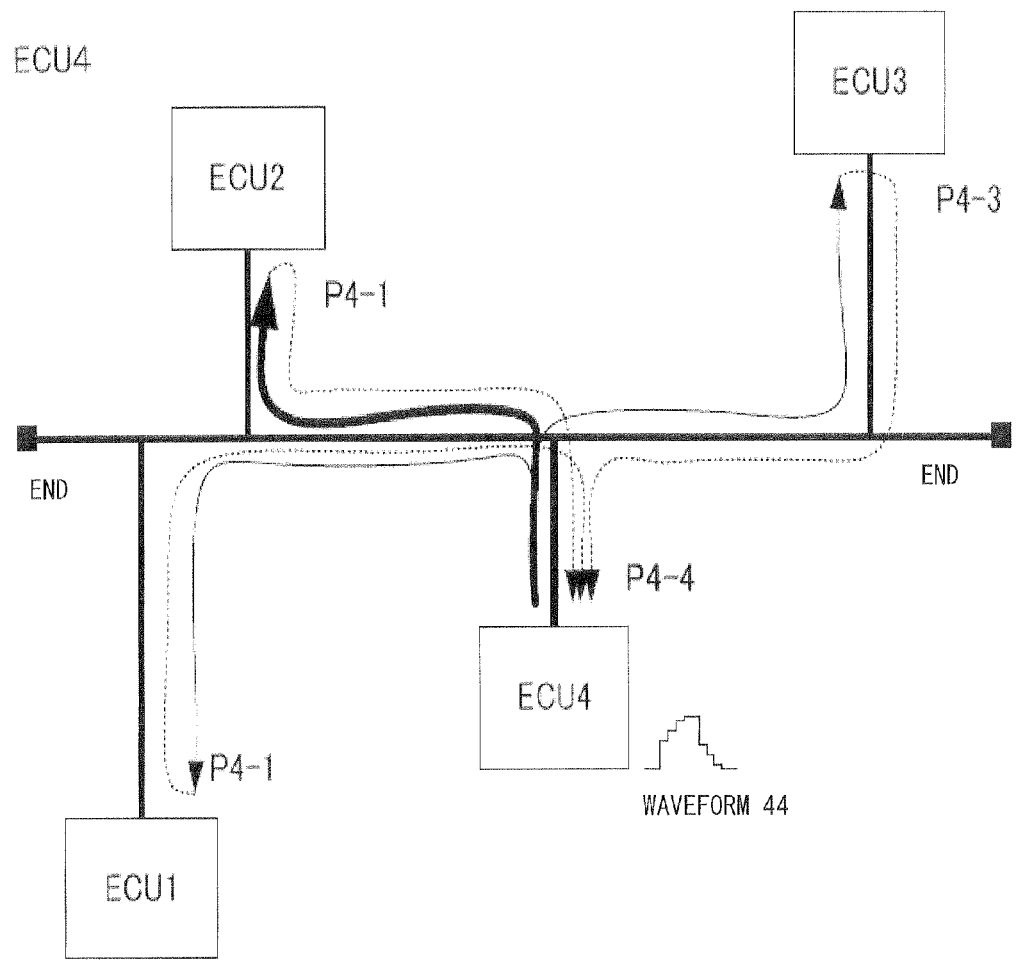
FIG. 5B is an explanatory view of a waveform correction when the second method according to the conventional technology is applied to a bus system in which a plurality of ECUs are coupled.

As described above with reference to FIG. 4, the ECUs 132 and 133 receive overcorrected waveforms, but the overcorrection is adjusted at the receiving end.

Figure 13B:
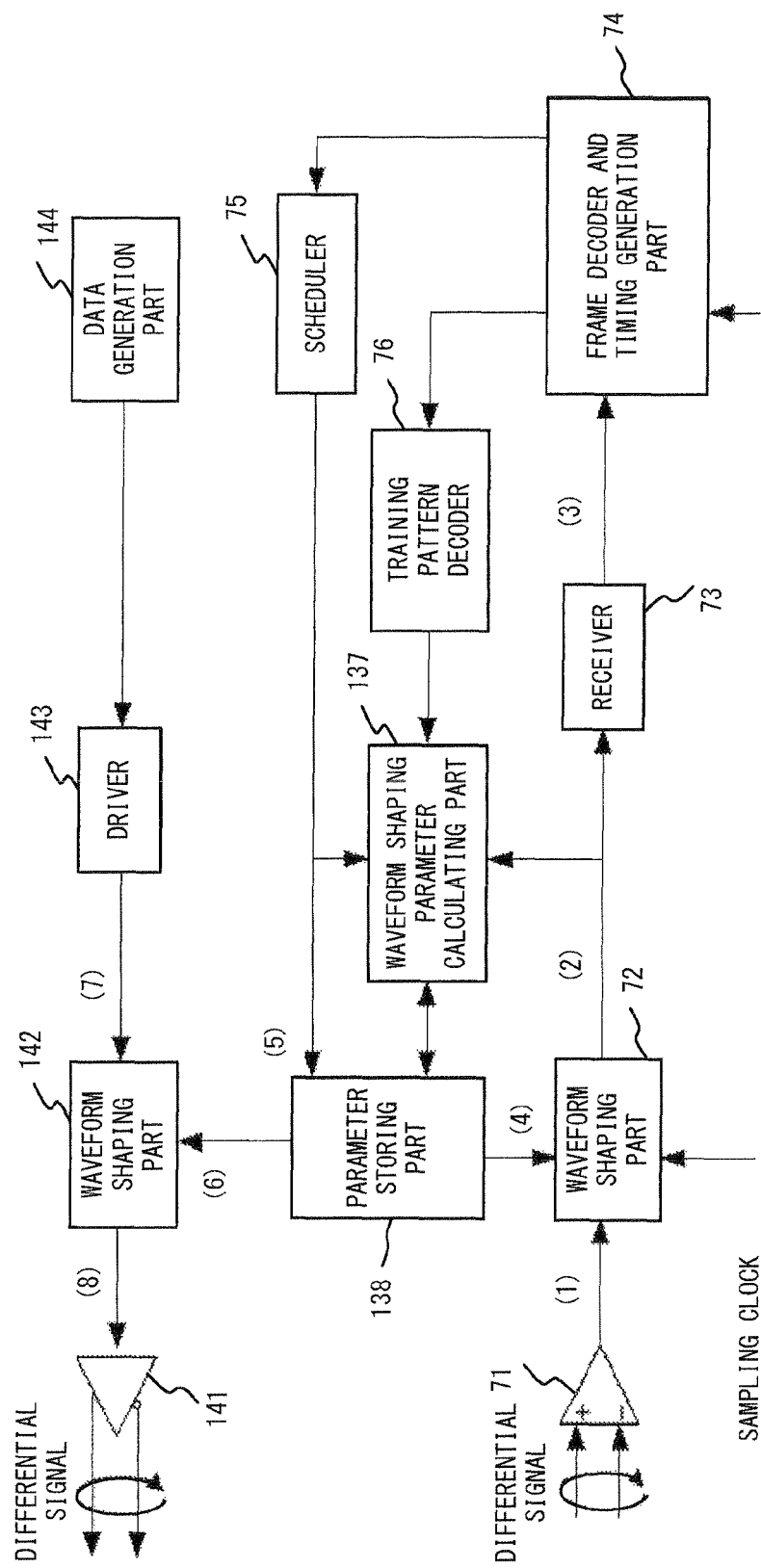
FIG. 13B illustrates an example of the configuration of a function block of the signal transmitter/receiver device according to the third embodiment.

FIG. 13B illustrates an example of the configuration of the function block of the signal transmitter/receiver device of the embodiment 3. The example of the configuration illustrated in FIG. 13B is obtained by adding the function block at the transmitting end including a data generation part 144, a driver 143, a waveform shaping part 142, and a differential amplifier 141 to the block configuration of the signal receiver apparatus illustrated in FIG. 7A.

Furthermore, the functions of a waveform shaping parameter calculating part 137 and a parameter storing part 138 are added and changed with respect to the functions of the waveform shaping parameter calculating part 77 and the parameter storing part 78 illustrated in FIG. 7A.

The parameter storing part 138 identifies the transmission of its node from the output (5) of the scheduler 75, and sets the reflective waveform correction data (4) to the waveform shaping part 72 at the receiving end as all "0" (without correction) during transmission.

The waveform shaping parameter calculating part 137 monitors a transmission waveform from the receiving end during the transmission of its node, and calculates the transmission waveform correcting parameter. That is, it receives the output waveform (8) of the waveform shaping part 142 at the transmitting end as the output (1) of the differential amplifier at the receiving end, the waveform shaping part 72 outputs the output (1) as the reception waveform (2) because the reflective waveform correction data (4) output from the parameter storing part is all "0", and the waveform shaping parameter calculating part 137 calculates the waveform shaping parameter for transmission on the basis of the output waveform (2) and enters the parameter in the parameter storing part 138. During the transmission, the waveform shaping part 142 at the transmitting end performs the waveform shaping using the waveform shaping parameter for transmission in the parameter storing part 138.

Figure 13C:
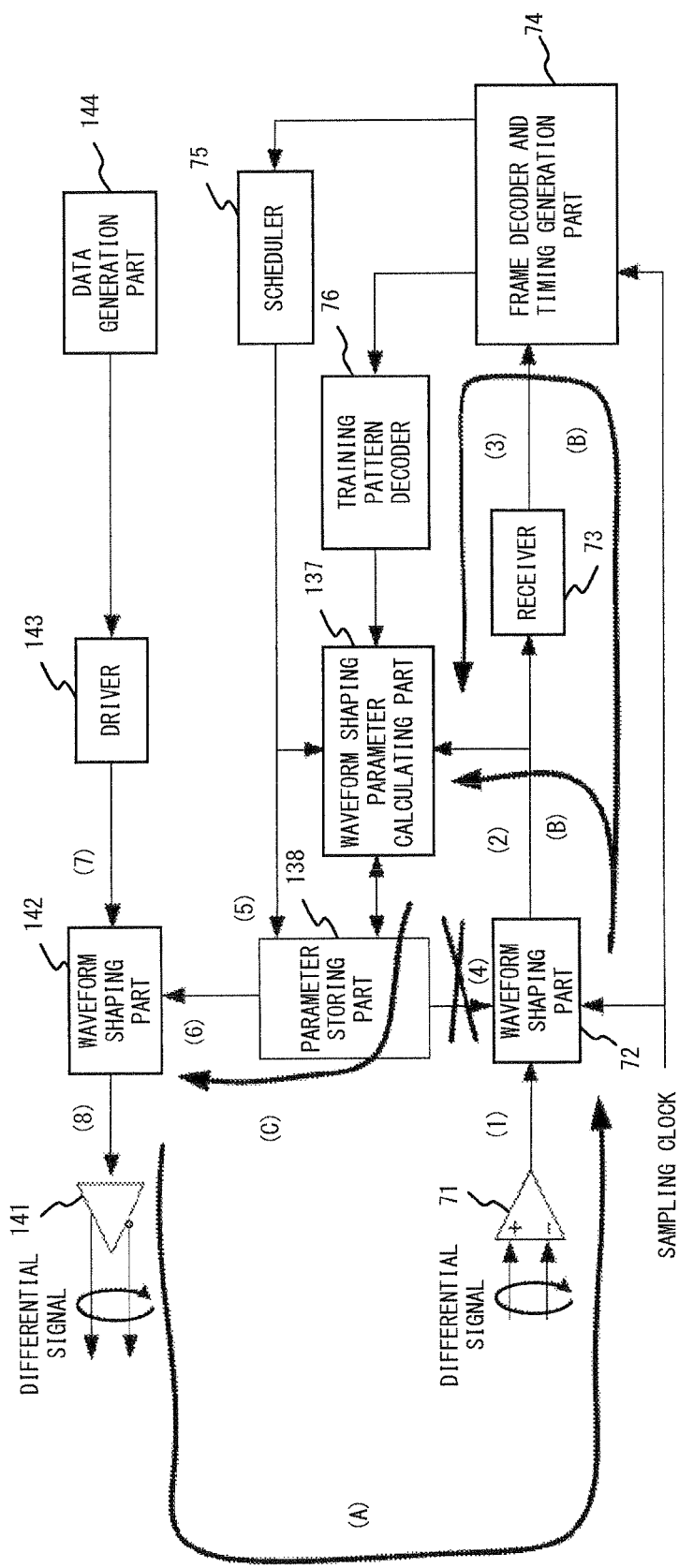
FIG. 13C is an explanatory view of the control route during transmission by the signal transmitter/receiver device according to the third embodiment.

FIG. 13C is an explanatory view of the control route during transmission in the signal transmitter/receiver device according to the embodiment 3.

First, in the route (A) in FIG. 13C, the waveform shaping part 72 at the receiving end receives a transmission waveform of its node from the differential amplifier 71. At this time, the waveform shaping part 72 at the receiving end does not perform a correction using shaping data. When a scheduler indicates the transmission timing of its node, the output (4) of the parameter storing part 138 does not perform a correction as illustrated in FIG. 13B.

Next, the route (B) illustrated in FIG. 13C is followed, and the waveform shaping parameter calculating part 137 generates waveform correction data in the process similar to the process described with reference to FIG. 8B to correct the transmission waveform including a reflective waveform to the original waveform.

Through the route (C) illustrated in FIG. 13C, the waveform correction data generated by the waveform shaping parameter calculating part 137 is stored in the parameter storing part 138. Using the waveform correction data, the bit data (7) specified by a data generation part 135 and output from a driver 136 is shaped by the waveform shaping parameter calculating part 137, and the transmission waveform (8) is output.

In the description of the embodiment 3, it is assumed that the transmitting end node is provided with all receiving functions, and the waveform shaping parameter calculating part 137 etc. has expanded functions of the waveform shaping parameter calculating part 77 etc. at the receiving end node. However, the present invention is not limited to the applications, but it is obvious that waveform shaping of a transmission waveform can be performed by the limited function of the monitor of the transmission waveform of its node.

According to aforementioned embodiments, a receiving end stores a waveform shaping parameter for each of a plurality of transmitting sources, and performs a waveform shaping process using a stored parameter corresponding to each transmitting source.

It may be also possible to provide a device for identifying a specific pattern of received data and assigning timing of updating data for correction of a waveform. In addition, a waveform shaping parameter corresponding to the period of the transmission bit data affected by the reflective wave is calculated and stored, and the degradation by the reflective waveform in the period of plural bits can be corrected. Furthermore, at the signal transmitting end, a signal can be transmitted after performing waveform shaping.

According to the aforementioned embodiments, waveform shaping data for each transmitting source is stored at a receiving end. Therefore, the waveform shaping can be realized for each transmitting source coupled through a bus having a plurality of transmitting sources, which has not been realized by the conventional technology, and a reflective waveform can be corrected depending on the difference in the difference in the transmission direction, which has not been performed in the conventional waveform shaping by the coupling through a bus including a plurality of transmitting sources. Thus, a number of communication nodes can be coupled over one network.

The aforementioned embodiments may be applied to the technology of correcting waveform degradation in the data communications using a bus, and more specifically to the waveform shaping technology used when data communications are performed among a number of signal transmitter devices in a bus system for which reflection protection is not sufficiently devised.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

The invention claimed is:

1. A signal receiver apparatus comprising:
a waveform shaping data storage device configured to store waveform shaping data of a signal transmitted with a given timing for each signal transmitter device of a plurality of signal transmitter devices which are coupled to the signal receiver apparatus; and
a waveform shaping device configured to read waveform shaping data of a respective signal transmitter device of the plurality of signal transmitter devices from the waveform shaping data storage device when a signal from the respective signal transmitter device is received, and to shape a waveform of a received signal from the respective signal transmitter device, to correct waveform degradation of the received signal.

2. The apparatus according to claim 1, further comprising:
a transmission scheduler configured to store a transmission schedule of the plurality of signal transmitter devices, and outputting identification information about a signal transmitter device indicating from which signal transmitter device in the plurality of signal transmitter devices the signal is received; and
a waveform shaping data calculation device monitoring a waveform state of a reception waveform, and calculating the waveform shaping data for each of the signal transmitter devices according to the identification information about the signal transmitter device output by the transmission scheduler.

3. The apparatus according to claim 2, wherein:
the waveform shaping data calculation device is configured to:
digitize an amplitude of a received signal waveform by sampling one transmission bit data as a received signal waveform-shaped by the waveform shaping device, calculates a difference between the digitized amplitude of the received signal waveform and a leading sampling value of the one transmission bit data;
read the waveform shaping data stored for the signal transmitter device from the waveform shaping data storage device; and
the calculation of the waveform shaping data is performed on a basis of the difference and the waveform shaping data read from the waveform shaping data storage device.

4. The apparatus according to claim 3, further comprising:
a specific pattern identification device configured to identify a specific pattern of the received signal and outputting to the waveform shaping data calculation device a trigger of updating the waveform shaping data stored in the waveform shaping data storage device to a newly calculated waveform shaping data.

5. The apparatus according to claim 4, wherein
the waveform shaping data storage device is configured to store a default of the waveform shaping data for the plurality of signal transmitter devices when the signal receiver apparatus starts communications.

6. The apparatus according to claim 2, wherein
the waveform shaping data is calculated by the waveform shaping data calculation device for a reception waveform of "10" or "01" as a value of transmission bit data and stored in the waveform shaping data storage device.

7. The apparatus according to claim 2, wherein
the waveform shaping data is calculated by the waveform shaping data calculation device for a current transmission bit and a past transmission bit of a reception waveform of "1100" or "0011" as a value of transmission bit data and stored in the waveform shaping data storage device.

8. The apparatus according to claim 7, further comprising:
a waveform data calculation part configured to output change information about waveforms "0" and "1", to read the current transmission bit and the past transmission bit of the waveform shaping data from the waveform shaping data storage device when the change information about the waveforms "0" and "1" is output for each transmission bit, to output a sum of the data as waveform shaping data to the waveform shaping data storage device, to read the past transmission bit of the waveform shaping data from the waveform shaping data storage device when the change information about the waveforms "0" and "1" is output for two transmission bits, and to output the data as waveform shaping data to the waveform shaping data storage device.

9. A signal transmitter device coupled to the signal receiver apparatus according to claim 1, comprising:
   a device configured to receive a signal transmitted by the signal transmitter device on a bus coupled to the signal receiver apparatus;
   a transmitting end waveform shaping data coupling device configured to monitor a waveform state of the received waveform, and to calculate waveform shaping data of transmission data transmitted by the signal transmitter device on the bus coupled to the signal receiver apparatus; and
   a transmitting end waveform shaping device configured to perform waveform shaping of transmission data on a basis of the waveform shaping data calculated by the transmitting end waveform shaping data coupling device.

10. The signal transmitter device according to claim 9, further comprising:
    a waveform shaping data storage device configured to store waveform shaping data of a signal transmitted with the given timing from the signal transmitter device for each of the plurality of signal transmitter devices;
    a transmission scheduler configured to store a transmission schedule of the plurality of signal transmitter devices, and to output identification information about a signal transmitter device indicating from which signal transmitter device in the plurality of signal transmitter devices the signal is received; and
    a waveform shaping device configured to read waveform shaping data of a signal transmitter device in the plurality of signal transmitter devices from the waveform shaping data storage device when a signal from the signal transmitter device is received, and to shape a waveform of a received signal from the signal transmitter device, to correct waveform degradation of the received signal, and
    when the identification information output by the transmission schedule is related to the signal transmitter device, the waveform shaping data storage device is configured to set the waveform shaping data read by the waveform shaping device as all 0;
    the waveform shaping device is configured to output the received signal to the transmitting end waveform shaping data calculation device without waveform shaping; and
    the transmitting end waveform shaping data calculation device is configured to calculate the waveform shaping data of the transmission data transmitted by the signal transmitter device on a basis of the received signal not waveform shaped.

11. A waveform shaping method for use with a signal receiver apparatus which is coupled to a bus to which a plurality of signal transmitter devices capable of transmitting a signal with given timing are coupled, and receives a signal transmitted from the plurality of signal transmitter devices, and the signal receiver apparatus comprising a waveform shaping data storage device configured to
    store waveform shaping data of a signal transmitted with the given timing from the signal transmitter device for each of the plurality of signal transmitter devices, the method comprising:
       receiving a signal from a signal transmitter device in the plurality of signal transmitter devices;
       reading waveform shaping data of the signal transmitter device from the waveform shaping data storage device; and
       shaping a waveform of a received signal from the signal transmitter device, to correct waveform degradation of the received signal.

12. The method according to claim 11, wherein
    the signal receiver apparatus further comprises a transmission scheduler configured to store a transmission schedule of the plurality of signal transmitter devices, and to output identification information about a signal transmitter device indicating from which signal transmitter device in the plurality of signal transmitter devices the signal is received; and
    monitors a waveform state of a reception waveform, and calculates the waveform shaping data for each of the signal transmitter devices according to the identification information about the signal transmitter device output by the transmission scheduler.

13. The method according to claim 12, further comprising:
    digitizing an amplitude of a received signal waveform by sampling one transmission bit data as a received signal waveform-shaped by the waveform shaping device;
    calculating a difference between the digitized amplitude of the received signal waveform and a leading sampling value of the one transmission bit data;
    reading the waveform shaping data stored for the signal transmitter device from the waveform shaping data storage device; and
    wherein the calculation of the waveform shaping data is performed on a basis of the difference and the waveform shaping data.

14. The method according to claim 13, further comprising:
    identifying a specific pattern of a received signal; and
    updating the waveform shaping data stored in the waveform shaping data storage device to a newly calculated waveform shaping data.

* * * * *